United States Patent [19]

Blades

[11] 3,869,429

[45] Mar. 4, 1975

[54] HIGH STRENGTH POLYAMIDE FIBERS AND FILMS

[75] Inventor: Herbert Blades, Hockessin, Del.

[73] Assignee: E. I. du Pont de Nemours and Company, Wilmington, Del.

[22] Filed: June 30, 1972

[21] Appl. No.: 268,057

Related U.S. Application Data

[63] Continuation-in-part of Ser. No. 172,572, Aug. 17, 1971, abandoned, which is a continuation-in-part of Ser. No. 138,180, April 28, 1971, abandoned.

[52] U.S. Cl. ......... 260/78 S, 57/140 R, 260/47 CZ, 260/78 R, 260/78 UA, 264/184, 264/203
[51] Int. Cl. ..................... C08g 20/20, C08g 20/38
[58] Field of Search ............... 260/78 R, 78 A, 78 S

[56] References Cited
UNITED STATES PATENTS

| | | | |
|---|---|---|---|
| 3,079,219 | 2/1963 | King | 260/78 A |
| 3,094,511 | 6/1963 | Hill et al. | 260/78 R |
| 3,287,324 | 11/1966 | Sweeny | 260/78 R |
| 3,354,127 | 11/1967 | Hill et al. | 260/78 R |
| 3,414,645 | 12/1968 | Morgan | 264/210 F |
| 3,472,819 | 10/1969 | Stephens | 260/78 A |
| 3,542,719 | 11/1970 | Pollack | 260/78 A |
| 3,560,137 | 2/1971 | Hahn | 260/78 R |
| 3,574,811 | 4/1971 | Jamison | 264/210 F |
| 3,595,951 | 7/1971 | Logullo | 260/78 A |
| 3,627,737 | 12/1971 | Smith | 260/78 R |
| 3,642,706 | 2/1972 | Morgan | 260/78 S |
| 3,671,542 | 6/1972 | Kwolek | 260/78 S |
| 3,673,143 | 6/1972 | Bair et al. | 260/78 S |

OTHER PUBLICATIONS

Kunststoffe, Vol. 53, July, 1963, p. 21.

*Primary Examiner*—Harold D. Anderson
*Attorney, Agent, or Firm*—Sol Schwartz

[57] ABSTRACT

Fibers and films of extremely high strength, i.e. at least about 18 gpd. consist essentially of certain polyamides. These products have filament and film elongations of at least 3.5% and possess a novel crystalline structure with crystalline regions having a primary apparent crystallite size of less than 52 Angstrom units.

12 Claims, 10 Drawing Figures

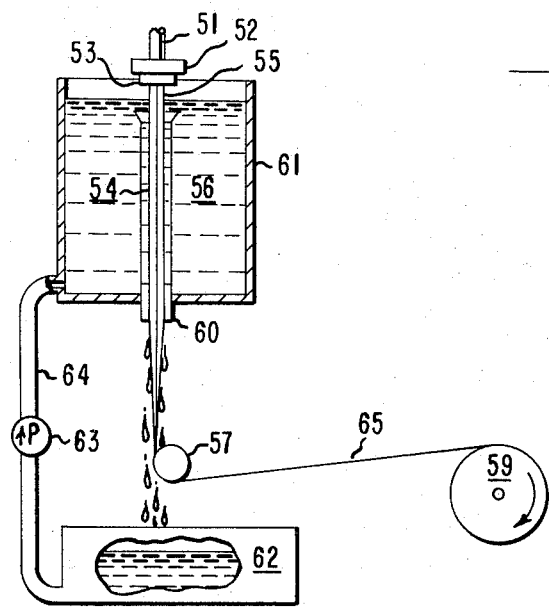
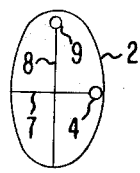
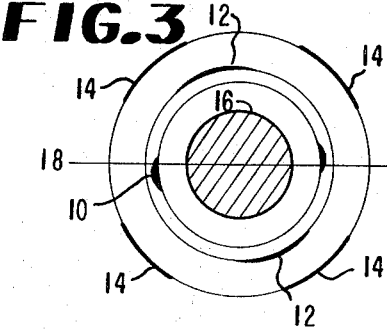
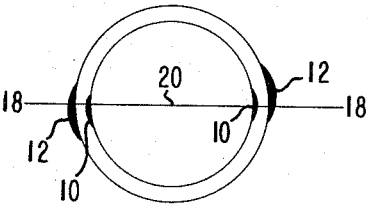
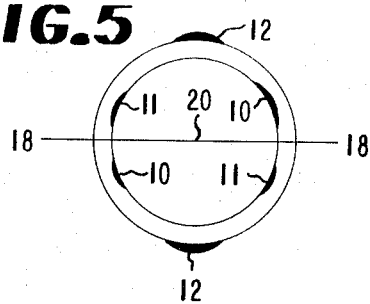
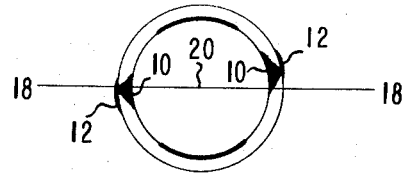

HIGH STRENGTH POLYAMIDE FIBERS AND FILMS

CROSS REFERENCE TO RELATED APPLICATIONS

This application is a continuation-in-part of my application Ser. No. 172,572, filed Aug. 17, 1971, now abandoned which in turn is a continuation-in-part of my application Ser. No. 138,180, filed Apr. 28, 1971, now abandoned.

This invention relates to fibers having a novel structure and improved properties prepared from certain polyamides. Novel films are also encompassed.

BACKGROUND OF THE INVENTION

The prior art U.S. Pat. No. 3,414,645 to Morgan teaches a dry jet wet spinning process of extruding a solution of wholly aromatic polyamides through a gaseous medium into a coagulating bath, followed by stretching in a wash liquid, washing, drying and hot drawing to produce filaments.

U.S. Pat. No. 3,671,542 to Kwolek teaches the use of certain optically anisotropic dopes of carbocyclic aromatic polyamides in wet spinning processes to afford fibers of good strength as-spun, i.e. without a drawing or heating process. A high temperature treatment with tension raises the strength to higher values. It has been found that these heating processes may adversely affect certain fiber properties for many uses. Heating causes an increase in crystallinity and generally a reduction in fiber toughness and elongation at break. Fibers may become brittle on heating, as indicated by a loss in transverse tensile properties, reducing their value for such uses as tire cords.

SUMMARY OF THE INVENTION

This invention provides as-spun polyamide fiber and film processing unusually high levels of tenacity as compared with corresponding prior art products of the same polymer.

The fibers and films of this invention are characterized by unusually high levels of tenacity in combination with moderate levels of elongation which affords high toughness at low to moderate degrees of crystallinity as indicated by the apparent crystallite size.

The fibers and films of this invention consist essentially of certain polyamides having an inherent viscosity of at least 2.5. The products have filament and film elongations of at least 3.5 percent, filament and film tenacities of at least 18 grams per denier and are characterized by a primary apparent crystallite size of less than 52A and a structure that exhibits radial orientation. The Quantitative Lateral Crystallite Order Test shows this radial orientation in a preferred class of fibers and films having an LCO value of at least 10 and more preferably at least 20.

Tenacities of filaments of the invention may range from 18 to 32 grams per denier (gpd) or higher, elongations from 3.5 to 7 percent or higher, toughness values from 0.40 to 1.5 gpd or higher and modulus values from 300 to 800 gpd or higher. Fibers having a modulus of at least 400 are preferred. The fibers have orientation angles of from about 30° to 12°.

BRIEF DESCRIPTION OF THE DRAWINGS

FIG. 1 shows a schematic view of one type of apparatus for carrying out a process suitable for preparing the fibers of this invention.

FIG. 2 is a drawing of a fiber section.

FIGS. 3, 4, 5 and 6 are graphic representations of electron diffraction patterns of a selected area of a fiber section. In solid arcs the thickness is proportional to the photographic density.

In FIG. 1, a spin dope is pumped through transfer line 51 through a spinning block 52, through the orifices of spinneret 53 through a layer of gas 55 and into a coagulating liquid 56 in spin tube 60 through which the filaments 54 are conducted. A strong as-spun multifilament bundle 65 is passed under guide 57 and is wound up on a rotating bobbin 59. The coagulating liquid 56 flows from container 61 through spin tube 60 and falls to container 62 from whence it is returned by pump 63 and tube 64 to container 61.

DESCRIPTION OF THE PREFERRED EMBODIMENTS

Figure 7:
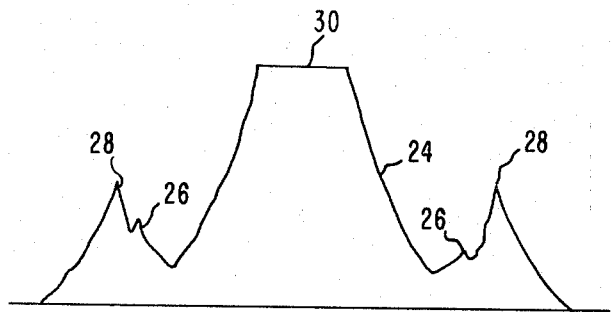
FIGS. 7 and 10 are drawings of a densitometer trace of a complete and half diffraction pattern, respectively.

The polyamide of the fiber and film of the present invention consists essentially of recurring units selected from the group:

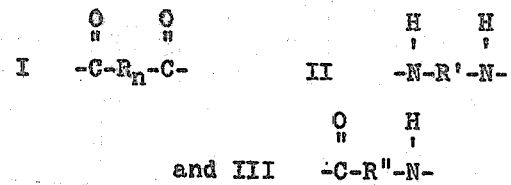

wherein units I and II, if present in the polymer, are present in substantially equimolar amounts, R, R' and R" which may be the same or different are divalent radicals, n may be zero or the integer one, and at least 95 mol % of the total R, R' and R" radicals in the polymer consist of single rigid radicals with extended bonds or a series of such rigid radicals which are linked together directly by extended bonds. In addition, azo —N=N— and azoxy

radicals can serve to link two rigid ring radicals. Thus, the essential portion of the polymer consists of polyamide units (including polyoxamide units when $n$ is zero), which provide stiff chains. As-spun fiber and film prepared in accordance with the present invention from copolyamide, i.e. wherein R or R' is a mixture of at least two different radicals or wherein units I, II and III are present, will have an elongation of at least 4.5 percent whereas products prepared from homopolyamide will have an elongation of at least 3.5 percent.

By the expression "rigid radicals" is meant (a) the ring radicals: single ring or fused multi-ring aromatic carbocyclic or heterocyclic radicals, trans-1,4-cyclohexylene

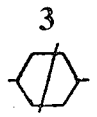

and 1,4-[2,2,2]-bicyclo-octylene and (b) the linear unsaturated radicals: vinylene

and ethynylene —C ≡ C—. It will be understood that monomers containing amino groups directly attached to linear unsaturated radicals are not stable and hence vinylene or ethynylene cannot serve as R' or that portion of a R'' radical attached to

It is preferred that at least 75 mol % of the rigid radicals in the polymer be aromatic carbocyclic radicals.

By the expression "extended bonds" is meant chain-extending bonds of the radical (as determined by the true bond angle) which are essentially coaxial (as in p-phenylene,

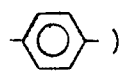

or parallel (as in 1,5-naphthylene

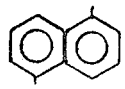

and trans-1,4-cyclohexylene) and oppositely directed. These polymer structures additionally have the characteristic of forming anisotropic or liquid crystalline phases when mixed with certain strong protonic acid solvents, as will be discussed in greater detail in a later section.

Preferred radicals with extended bonds suitable for R, R' and R'' are trans-1,4-cyclohexylene, 1,4-phenylene, 1,5-naphthylene, 2,6-naphthylene , 4,4'-biphenylene , 2,5-pyridylene trans,trans-4,4'-bicyclohexylene

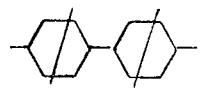

radicals and 1,4-phenylene groups linked by trans-vinylene, ethynylene, azo or azoxy. In addition, R may be trans-vinylene, ethynylene, trans,trans-1,4-butadienylene

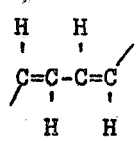

or 2,4'-trans-vinylenephenylene

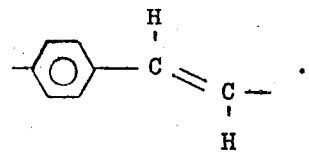

The latter radical may also serve as R''. It is preferred that at least 75 mol % of the total of R, R' and R'' are wholly aromatic carbocyclic radicals.

R, R' and R'' are intended to include substituted and/or unsubstituted radicals. The substituents, if any, should preferably be nonreactive (e.g., thermally) during subsequent processing of the polymer, e.g., heat treating of a shaped article thereof. Such reactivity is undesirable in that it may cause branching and cross-linking of the polymer and may adversely affect the dope and/or fiber properties. Among the preferred nonreactive substituents may be named halogens (e.g., chloro, bromo and fluoro), lower alkyl (e.g., methyl, ethyl and isopropyl), methoxy, cyano, and nitro. Other suitable substituents will be evident to those skilled in the art and are contemplated herein. Generally, it is preferred that no more than two (and more preferably no more than one) suitable substituents be present per single radical. Preferably no more than 20 mol % of the total R, R' and R'' radicals in the polymer should be substituted R''.

A preferred class of the polymers of the group described above are those polyamides (n being the integer one) wherein R and R' are selected from the group 1,4-phenylene, 4,4'-biphenylene, 2,6-naphthylene, 1,5-naphthylene and trans-1,4-cyclohexylene; R is additionally selected from the group 2,5-pyridylene and trans-vinylene; R'' is 1,4-phenylene and at least 50 mol % of the total of R and R' is wholly aromatic. Of this preferred class of polymers, the most preferred are those wherein R is selected from the group 1,4-phenylene, 4,4'-biphenylene, 2,6-naphthylene, 2,5-pyridylene, trans-1,4-cyclohexylene and trans-vinylene; R' is selected from trans-1,4-cyclohexylene, 1,4-phenylene and mixtures of 1,4-phenylene with up to 50 mol % of 4,4'-biphenylene; R'' is 1,4-phenylene with the provisions that (a) at least 75 mol % of the total of R and R' are wholly aromatic and (b) at least 75 mol % of either R or R' is 1,4-phenylene.

The chains of the linear condensation polymers of the invention may include up to about 5 percent (mol basis) of radicals not conforming to the above cited description, e.g., not having extended bonds, or non-rigid.

It is to be understood that these non-conforming radicals differ in their effect on the properties of the as-spun products. Thus, rigid radicals such as m-phenylene, whose chain extending bonds are neither coaxial nor parallel and oppositely directed, and highly flexible radicals such as hexamethylene and decamethylene will ordinarily be used in small proportions, whereas radicals such as 4,4'-bibenzylene may be used in larger amounts, even exceeding 5 percent to yield fibers which still exhibit the unusual combination of properties of products of the invention. While not preferred, a small proportion of the amide units in the linear condensation polymer chain may be replaced, if desired, by other stable non-amide-forming units, e.g., ester-forming units or urea or sulfonamide-forming units. In general, such products are more difficult to prepare and are more restricted in their utility.

The polymer to be spun may be a homopolymer, random copolymer, ordered copolymer or blend of homopolymers and/or copolymers of the above description. The usual additives such as dyes, fillers, delusterants, UV stabilizers, anti-oxidants, etc., may be incorporated in the fibers and films of this invention.

Among the suitable polyamides described above may be named: poly(p-phenylene terephthalamide) (hereafter PPD-T); poly(p-phenylene p,p'-biphenyldicarboxamide); poly(p-phenylene 1,5-naphthalenedicarboxamide); poly(trans,trans-4,4'-dodecahydrobiphenylene terephthalamide); poly(trans-1,4-cinnamamide); poly(p-phenylene 4,8-quinolinedicarboxamide); poly(1,4-[2,2,2]-bicyclooctylene terephthalamide); copoly(p-phenylene 4,4'-azoxybenzenedicarboxamide/terephthalamide); poly(p-phenylene4,4'-trans-stilbenedicarboxamide) and poly(p-phenylene acetylenedicarboxamide).

Preparation of Polyamides

The polymers for use in this process are conveniently made by reacting suitable monomers in the presence of an amide type solvent by low temperature techniques as taught in U.S. Pat. No. 3,063,966 to Kwolek et al. In order to obtain high molecular weight polymers the monomers and solvent should contain a minimum of impurities and the water content of the total reaction mixture should be less than 0.03 percent by weight.

Poly(p-phenylene terephthalamide) is conveniently made by dissolving 1,728 parts of p-phenylenediamine in a mixture of 15,200 parts of hexamethylphosphoramide and 30,400 parts of N-methylpyrrolidone, cooling to 15°C. in a polymer kettle blanketed with nitrogen and then adding 3,243 parts of powdered terephthaloyl chloride with rapid stirring. The solution gels and turns into a dry crumb-like material in 3 to 4 minutes. The stirring is continued for 1.5 hours when possible with cooling to keep the product temperature at about 25°C. The polymerization is essentially quantitative and the final reaction mixture contains 7.5% polymer of about 5.5 inherent viscosity (hereafter I.V.). The I.V. of the polymer from this system can be controlled by the ratio of monomer to solvent. Reduction of the amount of monomer from 9.83% above to 8.64% gives a reaction mixture containing 6.5% polymer of 6.0 I.V. The use of about 11.7% of monomers gives a reaction mixture of 9.0% polymer of 2.5 I.V.

The crumb-like acidic product is vigorously stirred or ground with water in a Waring Blendor or a colloid mill and the resulting polymer slurry filtered. The wet polymer is further washed by reslurrying with soft water to remove solvent and HCl and collected on a filter. This slurrying and filtering is repeated about four times in sequence followed by a final wash with distilled water. To aid in neutralization, one of the soft water washes may also contain sodium carbonate or hydroxide. The polymer is then dried at 120°–140°C.

Polymerizations can also be carried out by the continuous mixing of the monomers.

The products of this invention can be made by extruding a dope containing at least 30, preferably at least 40, grams of polymer per 100 ml. of solvent (volume determined at 25°C.) through a thin layer of gas into a cold coagulating bath, removing the solvent, washing and drying. Where the solvent is sulfuric acid of about 98 to about 100% $H_2SO_4$, this corresponds to dopes containing at least 14, preferably at least 18, weight % of polymer.

The tenacities and moduli of the fibers prepared as described above from the aforementioned polyamides are so high that such polyamides can be diluted by blending with other polymers and still fibers of high tenacity can be prepared. Such a blend can contain as much as 30 percent by weight of the diluent polymer which should be compatible with the other polymer in the acid solvent and reasonably stable. For example a fiber made from a blend of 86% PPD-T of 5.4 I.V. and 14% of poly(m-phenylene isophthalamide) of 1.16 I.V. had a filament tensile strength of 23 gpd. and L.C.O. values of over 10.

Suitable Dope Solvents

Suitable solvents include sulfuric acid, chlorosulfuric acid, fluorosulfuric acid and mixtures of these acids. Minor proportions of hydrofluoric acid, trifluoromethane-sulfonic acid, p-chlorobenzenesulfonic acid, or 1,1,2,2-tetra-fluoroethanesulfonic acid may also be present. The sulfuric acid used should contain at least 98% $H_2SO_4$. Fuming sulfuric acid may be used.

Preparation of Dopes

The water content of the dope should be carefully controlled to be less than 2 percent. Excessive water can interfere with the formation of dopes suitable for spinning and also lead to excessive degradation of the polymer. The relatively dry polymer (preferably less than 1% water) should be mixed with a "dry" solvent under conditions minimizing exposure to atmospheric moisture and the dope stored under a dry atmosphere.

The dopes should be mixed and held in the spinning process at as low a temperature as is practical to keep them liquid in order to reduce degradation of the polymer resulting in lower inherent viscosity values. Exposures to temperatures over about 90°C. should be minimized.

A particularly useful method is to continuously prepare the dope and feed directly to the spinnerets, thus minimizing any holding time. If batch processes are used and dopes are to be stored for later use, they may be frozen to a solid form, preferably under a blanket of dry nitrogen. Such solidified dope can be crushed to granules or powder and subsequently used to feed a screw melting device leading to a spinneret.

It is desirable that the extrusion of a dope result in a fiber or film with an I.V. of at least 2.5, preferably at least 3.0 and more preferably at least 4.0. A given fiber or film I.V. can be obtained by starting with a polymer of a moderate I.V. and processing to keep degradation to a minimum or by starting with a higher I.V. and processing for more severe degradation.

The concentration of the dope is expressed as grams of polymer per 100 ml. of solvent at 25°C. It may be noted that the useful solvents all have high density ($H_2SO_4$ 1.83 g./ml., $HSO_3Cl$ 1.79, $HSO_3F$ 1.74). Use of such high density solvents leads to a much higher volume fraction of polymer than obtains when alkylamides like hexamethylphosphoramide and dimethylacetamide (densities about 0.9–1.0 g./ml.) are used. High volume fraction is also provided by the high concentrations of polymer in the dopes. It is desirable to use as high dope concentration as possible. It has been found in general that the tenacity of the fibers produced increases with the concentration of the dope from which they were spun. Dopes of useful concentrations are solid at room temperature and melt to spinnable liquids when the temperature is raised. Increasing temperature causes polymer degradation as shown by loss in I.V.

It has been found advantageous in some instances to deaerate the liquid dope at reduced pressure prior to spinning.

The dopes or polymer-solvent system used in this process behave much like polymer melts. A typical dope of 46 grams of PPD-T of about 4 I.V. in 100 ml. of 100% sulfuric acid may have a bulk viscosity of about 900 poises at 105°C. which increases on cooling to about 1000 poises at 80°C. and then rapidly increases upon further cooling until the dope solidifies to an opaque solid below about 70°C. The bulk viscosity increases with higher inherent viscosities at a given concentration and temperature. The liquid dope referred to above is a turbid, translucent liquid at temperatures below about 135°C. at which temperature it becomes relatively clear.

In general, dopes can be extruded at any temperatures from the lowest at which they are sufficiently fluid to be handled and extruded up to about 120°C. Since the amount of degradation is dependent upon the time and temperature, temperatures as low as practical should be used, preferably below 90°C. If higher temperatures are desired for any reason, the equipment should be designed so that the exposure time of the dope to the elevated temperature is kept at a minimum.

The spinning dopes required to produce the products of this invention are unusual. Most are solids at room temperature. As the temperature is raised, they melt, becoming less viscous and translucent to transparent. They are optically anisotropic, i.e., microscopic regions of a given dope are birefringent; a bulk dope sample depolarizes plane polarized light because the light transmission properties of the microscopic areas of the dope vary with direction. This characteristic is associated with the existence of at least part of the dope in the liquid crystalline or mesmorphic state. These dopes exhibit anisotropy while in the relaxed state.

For a well mixed dope of given composition and concentration, the temperature at which melting occurs is fairly reproducible and reversible. This melting behavior is accompanied by an absorption of heat as indicated by differential thermal analysis. The melting temperature of a solidified dope can also be determined by measuring the intensity of polarized light passing through a thin sample and a 90° crossed analyzer as the temperature is raised. The melting temperature is that temperature at which the transmitted light intensity increases rapidly. In general, the melting temperature increases as the concentration increases. For example, PPD-T/sulfuric acid dopes of 32, 40 and 46 g./100 ml. acid show melting temperatures of 40°-50°C., 63°-65°C. and 72°-82°C., respectively. A dope that is incompletely mixed and has a distribution of phases of different concentration will have a broadened melting range.

As the temperature of a molten, anisotropic dope is increased, a point is reached at which the amount of anisotropic phase begins to decrease. This temperature ($Ta$) can be determined by a measurement of the change in the scattering of polarized light at small angles (e.g. 1°) on passing through a thin layer of dope. Ta increases with the concentration of the polymer, e.g., for PPD-T/$H_2SO_4$ dopes of 32, 40 and 46 g./100 ml. concentration, Ta values are found to be about 80°-100°C., 82°-135°C. and 110° to 122°C., respectively. Even above these temperatures the dopes are largely anisotropic and give good results in the present process, but highest tenacity fibers will be obtained by the spinning of dopes at temperatures above the melting point and below $Ta$.

Extrusion Conditions

These conditions are discussed in terms of spinning conditions for fibers in the following section. It will be understood that the comments can apply to the extrusion of films.

Spinnerets

Spinnerets and all other apparatus parts should be constructed of materials resistant to the strong acids used.

The diameters of the holes (orifices) and the ratio of the length of the capillary/diameter of the hole (L/D) in the spinneret are not critical. Strong fibers have been obtained with round orifices ranging from 1.0 to 10 mils (0.025 to 0.25 mm.) diameter and having a L/D ratio of from 1.0 to 8.3. The process is also operable with non-round holes of various shapes including narrow slits —0.02 × 0.05 mm. or 0.02 × 25 mm. for example.

The spacing of the holes is not critical and would be dictated by construction materials and by the threadline stability produced in spinning.

Jet Velocity

The jet velocity (designated "JV" is the average velocity of the dope in the spinneret capillary as calculated from the volume of dope passing through an orifice per unit time and from the cross-sectional area of the orifice) may range from 17 feet/minute (fpm) (5.1 meters/min.) or lower to 1,150 fpm (350 meters/min.) or higher. The minimum value for a given dope and orifice is determined by the ability of the dope to jet continuously and cleanly. The smaller diameter orifices will display a higher minimum jet velocity than larger orifices.

Spin Stretch Factor

The spin stretch factor (SSF) as expressed herein is the ratio of the velocity of the fiber as it leaves the coagulating bath to the jet velocity. Spin stretch factors of as low as 1.0 or lower and as high as 14 or more can be used. The minimum spin stretch factor to be used with a particular spinning dope and orifice is determined by the ability to form a filament of relatively uniform denier and the desired physical properties. The maximum useful spin stretch factor is limited by filament breakage in the process. In general, increasing the spin stretch factor from a low value at a given jet velocity affords fibers with higher tenacities and moduli and lower elongations and denier. One skilled in spinning will readily adjust orifice diameter, thickness of the gas layer, jet velocity and spin stretch factor for a given spinning dope and apparatus to obtain a fiber of the desired denier and physical properties.

Fluid Layer

It is essential that the spinneret face be separated from the coagulating bath by a fluid layer of gas or a noncoagulating liquid such as toluene, heptane, etc. The thickness of the fluid layer can vary from 0.1 to 10 cm. or more and preferably is from about 0.5 to 2 cm.

thick. Use of larger thickness increases the opportunity for adjacent filaments to fuse together.

Spin Tube and Guides

The configuration of the spin tube 60 and the character of the guide 57 in FIG. 1 can affect the elongation and modulus in the as-spun yarn. At the same jet velocity and windup speeds, a straight tube generally produces higher yarn elongation and lower modulus than a tube constricted at its lower end. Similarly, a roller guide generally produces higher yarn elongation than a snubbing pin. Useful spin tube dimensions will vary with spinning speeds and yarn denier.

Coagulating Bath

Satisfactory results have been obtained with aqueous baths ranging from pure water and brine to 70% $H_2SO_4$. Bath temperatures ranging from −25°C. to 28°C. have been satisfactory. It is considered that a wide variety of aqueous solutions can be used at temperatures from subzero to 50°C. or more.

Preferably the temperature of the bath (e.g., water or dilute $H_2SO_4$) is kept below about 10°C. (more preferably below 5°C.) in order to obtain the highest tenacity in the filaments.

Washing

Due to the degrading effects of even small amounts of acid in the yarn, complete removal of the acid is very important in obtaining high tenacity fibers. Water alone or combinations of alkaline solutions and water may be used for its removal.

A convenient method is to spray the thread line as it leaves the coagulating bath with an aqueous alkaline solution (e.g. saturated $NaHCO_3$ or 0.05N NaOH), remove surface liquid from the thread line with a wiping device (e.g. a sponge) or a jet, wash with water (ca 75°C.) to reduce the acid content to about 1 percent (on a dry fiber basis) and wind up on bobbins. Such bobbins can be stored for short periods (up to about 24 hours) in water or dilute alkaline solution before the final wash. Preferably the final wash (e.g. with 75°C. water) should reduce the acid or base content below 0.01 percent (on a dry basis).

While small amounts of yarn can be washed and neutralized on the bobbin, it is preferred that the yarn be washed as such in thin layers in flumes, on rolls with overhead sprays, on screens, belts or the like. In a continuous process the thread line can be washed and neutralized continuously at the same speed as the thread line at any point between spinning and wind up.

Drying

The thoroughly washed fibers can be dried on the bobbin with air at up to 150°C. The fibers can conveniently be dried on heated rolls (e.g. 160°C.) If the fibers are dried while under a tension of less than about 0.3 gpd, which is a preferred method, the properties are not significantly changed. Fibers dried under such mild conditions for a time needed only to reduce water content of 2–10 percent will have a primary apparent crystallite size of less than 52 A and are considered as as-spun. The use of tensions above 0.3 gpd reduces the elongation and increases the modulus from that obtained by tensionless drying.

Heat Treatment

The properties of the as-spun yarns can be altered by a heat treatment. Heating a yarn under tension, preferably in an inert atmosphere, at temperatures of 150°C. to 550°C. increases the yarn modulus from about 15 to 100 percent and reduces the yarn elongation by about 50 percent. The modulus increase is greater with increasing tension and temperature. Typical tensions and times of exposure used at 150°C. are about 2 to 12 gpd for 1.5 to 6 seconds and at 550°C. are 0.5 to 2 gpd for 1 to 6 seconds. At low and intermediate temperatures, the yarn tenacity is not significantly changed, but it may be reduced after treatment at 450°C. or more.

Yarns to be heat-treated are usually dry beforehand but the heat treatment effects can be produced on wet yarns direct from washing or on rewet dried yarns by slightly lengthening the time of heating.

Applicant has made fibers having tenacities less than those indicated in the examples when conditions other than optimum were used.

Test Procedures

Inherent Viscosity

Inherent viscosity (I.V.) is defined by the equation:

$$I.V. = \ln(\eta rel)/c$$

where $c$ is the concentration (0.5 gram of polymer or fiber in 100 ml. of solvent) of the polymer solution and $\eta rel$ (relative viscosity) is the ratio between the flow times of the polymer solution and the solvent as measured at 30°C. in a capillary viscometer. The inherent viscosity values reported and specified herein are determined using concentrated sulfuric acid (95–98% $H_2SO_4$) unless otherwise specified.

Fiber Tensile Properties

Filament properties are measured on fibers that have been conditioned at 21°C. and 65 percent relative humidity (R.H.) for at least 16 hours unless otherwise specified. Yarn properties are measured on yarn that has been conditioned at 24°C. and 55% R.H. for at least 16 hours. All measurements are made in the fiber conditioning environment.

Tenacity (breaking tenacity) (Ten.), elongation (breaking elongation) (E), initial modulus (Mi), and toughness (breaking toughness) (Tou.) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on three filaments are averaged. Yarns are given three turns per inch (2.54 cm.) twist (under 0.1 gpd tension) and broken with a 10 inch (25.4 cm.) gage length. All samples are elongated at a constant rate of extension (10 percent elongation/minute for fibers having an E of under 8 percent, and 60 percent elongation/minute for fibers with E of 8 to 100 percent) until the sample breaks.

The denier of a single filament (d.p.f.) is calculated from its fundamental resonant frequency, determined by vibrating a 7 to 9 cm. length of fiber under tension with changing frequency. (A.S.T.M. D1577-66, part 25, 1968) This filament is then used for 1 break.

The denier of yarn is determined by weighing a known length (at 0.1 gpd tension); 90 cm. length is convenient.

The tenacity (grams/denier, g.p.d.), elongation (%), initial modulus (g.p.d.) and toughness (gram-centimeters per denier centimeter or simply g.p.d.) as defined in A.S.T.M. D2101, part 25, 1968 are obtained from the load-elongation curve and the measured denier. In actual practice, the measured denier of the sample, test conditions and sample identification are fed to a computer before the start of a test; the computer records the load-elongation curve of the fiber as it is broken and then calculates the fiber properties.

It should be noted that different values are obtained from single filaments (filament properties) and from multifilament strands (yarn properties) of the same sample. Filament tenacities are higher than yarn tenacities — typically about 1.2:1, filament elongations are higher than yarn elongation and filament moduli are lower than the yarn values. Unless specified otherwise all properties given herein are filament properties.

Tire cords are measured in the same manner as yarns described above except larger clamps are used on the Instron Instrument and the rate of elongation is 36 percent per minute. Loop properties are determined by breaking a pair of cords through a loop between the two cords. Each cord has both of its ends in the same clamp.

The physical properties of all yarns of the examples are measured with the yarn having three twists/inch (t.p.i.) (per 2.54 cm). This results in a different twist multiplier (T.M.) for yarns of different denier.

$$\text{T.M.} = [(\text{twists/inch})\sqrt{\text{denier of yarn}}]/73$$

It has been observed that the initial modulus of a yarn decreases as the T.M. is increased. for example, the modulus of a 700 denier yarn (T.M. 1.08 at 3 t.p.i.) will be lower by about 5 percent than that of an equivalent 200 denier yarn (T.M. 0.58 at 3 t.p.i.).

Film tensile and elongation properties are measured on films that have been conditioned in the same environment and manner as used for yarns. Test results are obtained from breaking the film using a 2 inch (5 cm.) gauge length at 100 percent elongation per minute.

Bulk Viscosities

Bulk viscosities are measured by a Brookfield Viscometer with a No. 7 spindle at 10 rpm.

Orientation Angle

An orientation angle of the fiber similar to the one discussed in "X-Ray Diffraction Methods in Polymer Science" by Leroy E. Alexander, Wiley-Interscience (1969) Chapter 4, p. 264, is determined by the following method. A wide angle X-ray diffraction pattern (transmission pattern) of the fiber is made using a Warhus pinhole camera. The camera consists of a collimator tube 3 in. (7.6 cm.) long with two lead (Pb) pinholes 25 mils (0.0635 cm.) in diameter at each end, with a sample-to-film distance of 5 cm.; a vacuum is created in the camera during the exposure. The radiation is generated by Philips X-ray unit (Cat. No. 12045) with a copper fine-focus diffraction tube (Catalog No. 14000320) and a nickel betafilter; the unit is operated at 40 kv. and 16 ma. A fiber-sample holder 20 mils (0.051 cm.) thick is filled with the sample; all the filaments in the X-ray beam are kept essentially parallel. The diffraction pattern is recorded on Kodak No-Screen medical X-ray film (NS-54T) or equivalent. The film is exposed for a sufficient time to obtain a pattern which is considered acceptable by conventional standards (e.g., a pattern in which the diffraction spot to be measured has a sufficient photographic density, e.g., between 0.2 and 1.0, to be accurately readable). Generally, an exposure time of about 25 minutes is suitable; however, a lesser exposure time may be suitable, and even desirable, for highly crystalline and oriented samples to obtain a more accurately readable pattern.

The arc length in degrees at the half-maximum density (angle subtending points of 50 percent of maximum density) of one of the principal equatorial spots is measured and taken as the orientation angle of the sample. The specific arc used for orientation angle determinations on fibers described in the following examples where more than one major arc is present is the one which occurs at the higher value of 2θ.

In one case, specifically poly(p-phenylene chloroterephthalamide), the diffraction pattern of the heat-treated fiber has been found in some instances not to contain any principal equatorial spots. When this occurs, two spots are generally observed, one on either side of the equatorial position. The orientation angle of these fibers is then measured on a suitable meridional arc (specifically the 006 reflection) using a diffractometer and this angle is compared to the orientation angle obtained on the corresponding arc by electron diffraction as described later.

The orientation angles of fibers of this invention are determined by a densitometer method from the x-ray film. The azimuthal density distribution of the diffraction arc is obtained by use of a Leeds & Northrup Microphotometer (Catalog No. 6700-Pl) whose electronic components have been replaced by a Keithley 410 Micro-Microammeter (Keithley Instruments Inc., Cleveland, Ohio). The output of this apparatus is fed to a Leeds & Northrup Speedomax Recorder, Type G.

In operation, the film is placed on the stage, the instrument is focused on the film, and the center of the diffraction pattern is made coincident with the stage center; both these centers are made coincident with the light beam of the instrument. The stage and mounted film are moved to permit the light beam to pass through the most dense area of the diffraction spot, the opposite spot is checked to insure true centering, and after any necessary fine adjustments are made, the recording of the azimuthal density trace through at least a 360° rotation of the film is made on suitable coordinate paper (e.g., Graphic Controls Corp., Buffalo, N.Y., No. 578). There is obtained a curve which has two major peaks in which the density axis is considered the vertical axis and the angular displacement the horizontal axis. A base line is drawn for each peak as a straight line tangential to the minima on each side of the peak. A perpendicular line is dropped from each peak maximum to the base line. On this perpendicular at a density (the "half-density" point) equal to the average of the density at the peak maximum and the density where the base line intersects the perpendicular, is drawn a horizontal line which intersects each leg of the respective curves. The leg-to-leg length of each half-density horizontal line is converted to the degrees of arc as follows. The horizontal distance equivalent to 360° of angular displacement is determined by rotation of a given point through 360° followed by direct measurement of the horizontal displacement for such a rotation. For example, one of the two major peaks above may be used for this purpose. By direct proportion, the half-density leg-to-leg distance is converted to a degree value. The values for the two arcs are averaged and this is the orientation angle referred to herein. Values determined by this method have been shown to be precise to ± 0.7° at the 95 percent probability level.

Method for Apparent Crystallite Size

X-ray diffraction scans of the fibers of this invention are different depending on the chemical structure, crystallinity and the degree of order and orientation in the fiber. A measure of apparent crystallite size (ACS)

for each of the observed major diffraction peaks is calculated from data obtained from an X-ray diffraction pattern using a reflection technique to record the intensity trace by means of an X-ray diffractometer.

A Philips X-ray generator, wide angle diffractometer and electronic circuit panel are used to record the diffraction pattern. Approximately 1.5 meters of yarn is wound around a modified Philips sample holder with the axis of the yarn perpendicular to the mechanical ($2\theta$) axis of the diffractometer. The modification of the sample holder consists of cutting approximately 21 notches, 0.01 inches wide, along the edge of the holder and cementing a thin sheet of lead foil across the bottom side of the rectangular opening so that only the fibers on top will be exposed to the X-ray beam. Using Nickel-filtered Copper radiation (1.5418A), a trace of the diffracted intensity is recorded from 6° to 38° $2\theta$, at a scanning speed of 1° $2\theta$ per minute, a chart speed of 0.5 inches per minute, at a time constant setting of 2, with 0.5° scattering and receiving slits and employing scintillation detector with a pulse height analyzer, $2\theta$ being the angle between the undiffracted and diffracted beam. The full scale deflection of the recorder is set so that the entire diffraction curve remains on scale, which is linear, but with as large a response as possible and preferably with the maximum intensity at least 50 percent of the scale.

The diffraction scans or diffractograms observed for fibers of this invention consist, when the sample is crystalline, of a pattern of multiple peaks. In most cases two major peaks are located in the range of about 17° to 25° $2\theta$ (for most samples 19° to 24° $2\theta$). In a few cases one of the two peaks will be evident only as an inflection, which, however, will be sufficient to locate its position. Occasionally, only one major narrow crystalline peak is observed. The procedure used to obtain the apparent crystallite size (cf. "X-ray Diffraction Methods in Polymer Science" by L. E. Alexander, Wiley-Interscience, 1969, Chapter 7) is given below.

If the sample is not crystalline, a single very broad peak will be the only feature of the diffractogram. In this case the apparent crystallite size is taken as zero.

A base line is first established on the scan by drawing a straight line between the points on the curve at 9° and 36° $2\theta$. Next, a vertical straight line is dropped from the top center of the selected peak to the base line, and a point midway between the top of the peak and the base line marked on this vertical line. A horizontal line is then drawn at this midpoint. This line may cut one shoulder of the peak or, if the minimum in between the two major peaks is low enough, both shoulders. The breadth of the selected peak at this point is obtained by either measuring the distance along the horizontal line from one shoulder to the vertical line and doubling it, or when possible the distance between both shoulders along the horizontal line. The distance is expressed as peak (or "line") breadth in radians, obtained by using the scale for $2\theta$ (established on the chart previously) to convert the observed line breadth in inches or centimeters to degrees and, eventually, radians. If B is the observed line breadth in radians, the corrected line breadth $\beta$ in radians is (cf. Alexander, op. cit., p. 443), $$\beta = \sqrt{B^2 - b^2}$$

where $b$ is the instrumental broadening in radians. The instrumental broadening constant $b$ is determined by measuring the line breadth of the peak located at approximately 28° $2\theta$ on the diffractogram of a silicon crystal powder sample supplied by the manufacturer of the X-ray equipment (Philips Electronic Instruments, Mount Vernon, N.Y.). The constant $b$ is this line breadth in radians. The instrument settings used are: scannning speed 0.125° $2\theta$ per minute, time constant setting 8 and chart speed 1 inch/min.

Finally, the apparent crystallite size associated with the selected reflection is given by $$ACS = (K \lambda)/(\beta \cos \theta)$$

where:
K is taken as one (unity)
$\lambda$ is X-ray wavelength (1.5418 A here)
$\beta$ is corrected line breadth in radians (see above)
$\theta$ is the Bragg angle (½ of the $2\theta$ value of the selected peak, as obtained from the diffractogram).

The primary apparent crystallite size (PACS) used in the structural definition of the products of this invention is defined for those fibers having more than one major crystalline peak as the apparent crystallite size calculated for that one of the two most intense peaks which is located at the smaller (smallest) value of $2\theta$. The peak at 20°–21° ($2\theta$) is used for PPD-T.

In this measurement, it is recognized that line breadth is affected by strains and imperfections in crystals (which are of unknown magnitude), as well as by crystallite size, and for this reason the value obtained by the above calculation is called the apparent crystallite size.

Values determined by this method have been shown to be precise to $\pm .2$ A at the 95 percent probability level.

QUANTITATIVE LATERAL CRYSTALLITE ORDER TEST

Introduction

The test, which involves the application of electron diffraction to thin fiber sections, demonstrates that the products of this invention have a unique lateral arrangement of crystalline planes which can be shown to be associated with the improved tenacity of the products. The preferred structure has one set of planes whose average position is parallel to planes that contain the fiber axis and radius.

In the test procedure the major (i.e., most intense) equatorial reflections in the conventional fiber x-ray diffraction pattern (obtained in the method for apparent crystallite size) are identified. Most fibers of this invention have two major reflections corresponding to d-spacings of from about 3.9 to 4.9A and are designated as "Class I Structures." Some fibers have only one major reflection corresponding to the same d-spacing range and are designated as "Class II Structures." An electron diffraction unit is calibrated so that the above major reflections can be identified in the electron diffraction pattern of specified thin fiber sections, since this test procedure is only concerned with those major reflections.

The densities of the major reflections in the electron diffraction patterns are measured in a specified manner and a lateral crystallite order (L.C.O.) value calculated.

Section Preparation

The fibers (or films) to be tested are heated relaxed or under low tension for a period of the order of about 10 seconds at a temperature in the range of 400°–500°C. with the exact conditions selected to avoid decomposition or degradation of the fiber. This heating is conveniently done by passing the fiber through a nitrogen filled heated metal tube under tension just sufficient to prevent contact with the tube.

A well-aligned bundle (about 1 mm. in diameter and 5 cm. long) of fibers is embedded in epoxy resin. A short segment is cut from the preparation and glued to the end of a tapered rod as a holding tool.

Heated film samples are most easily embedded using small "BEEM" capsules (e.g., from Ladd Research Industries, Burlington, Vt.). A cut is made in the tapered tip of a capsule along a diameter to admit the specimen, which is inserted into the cut with the edge of the film at 45° to the capsule axis. The capsule is then filled with epoxy resin and polymerized.

Sections 0.1 to 0.2 $\mu$ thick are cut from the embedded fiber or film samples preferably using a diamond knife and a microtome designed for preparing very thin sections (e.g., the "Ultrotome" by LKB of Stockholm, Sweden) at a cutting speed of 1 mm./second or less. The samples should be oriented while cutting so that the knife edge is perpendicular to the long axis (direction of extrusion) of the fiber bundle or film and is parallel to the thickness direction of the film.

Fibers and films having a class I structure are cut at an angle of about 45° to the long axis of the sample.

Fibers and films having a class II structure are cut so that the molecular chain axis is essentially normal to the surface of the section (established by using a polarizing microscope with a universal stage).

The film section should be prepared in such a way that it contains at least one long side (parallel to cutting direction) and one short side (normal to cutting direction) which are original extrusion surfaces.

Usable sections should be of such a quality that they do not contain excessive knife marks, chatter marks, wrinkles or compression distortions (see D. Kay, "Techniques for Electron Microscopy," Second Edition, page 220; F. A. Davis, Philadelphia 1965).

Electron Diffraction

The fiber sections prepared above are transferred to electron microscope grids and placed in the conventional high resolution position of an AE1 EM-6G electron microscope operated at an accelerating potential of 100 KV. The half-plate mask is turned into position. The microscope is set for diffraction and the diffraction coarse focus is turned one click counterclockwise (i.e., to produce a magnification of about 600X) from the diffraction focus position. The section to be studied is then rotated until the long axis (approximately parallel to the cutting direction and passes through the center of the section) of the fiber (or film) section is perpendicular to the edge of the half-plate mask. The selected area aperture (hereafter "aperture") (having an effective diameter of about 1 micron in the object plane) is placed along the short axis (through the center of the section and perpendicular to the long axis) of the fiber section centered at a point that is one or two aperture diameters from the edge of the fiber section (this will be referred to as the S-position). The diffraction pattern is then focused, the photographic film (DuPont Ortho-S) is advanced a little more than halfway into the column and the pattern recorded. The diffraction coarse focus is again turned one click counterclockwise and the aperture moved to a position along the long axis of the fiber section and centered at a point that is at a distance of one or two aperture diameters from the edge of the fiber section (this will be referred to as the L-position). The diffraction pattern is focused, the photographic film is advanced all the way into the column and the diffraction pattern recorded. The process is repeated for at least three different fiber sections.

FIG. 2 depicts the arrangement of a fiber section 2 (cut at 45°), the aperture 4 and the edge 6 of the half-plate mask in the microscope image prior to taking an S-position diffraction pattern. Also shown are the long axis 8 of te section perpendicular to edge 6, the short axis 7, and the position 9 of the aperture for the L-position pattern.

Sections of a film are oriented as above. The aperture is placed at any point one or two diameters in from either of the two long edges of the section and at a point one or two aperture diameters from the short edge of the section near its center for the S- and L-positions respectively.

The above procedure, after processing the film, yields three photographic negatives each having two electron diffraction (e.d.) patterns and a line (made by the edge of the half-plate mask) for each pattern.

FIG. 3 depicts a typical e.d. pattern taken in the S-position of a poly(p-phenylene terephthalamide) fiber of this invention. An index line 18 has been drawn through the center of the pattern parallel to the edge of the half-plate mask. The pattern has pairs of diffraction arcs 10, 12 and 14 with each arc of a pair being located by equal radii (from the center of the pattern). Each arc of a pair has its point of maximum density (hereafter "maxima" for arcs corresponding to the major equatorial reflections in the X-ray fiber pattern), as measured in an azimuthal direction, located on a line, not shown (hereafter "center line") passing through the center of the pattern. The center is obscured by a circular region of high density 16 caused by the incident electron beam. Arcs 10 and 12 are identified as the major reflections for this class I structure and therefore have "maxima."

FIG. 4 depicts an e.d. pattern taken in the L-position of the same section as used for FIG. 3. In this and succeeding Figures the dense portion about the center (20) has been omitted and only the major reflections are shown.

FIG. 5 depicts an e.d. pattern in the S-position. The locations of maxima (10, 11 and 12) correspond to the major reflections of x-ray.

A section of a fiber that is not a part of this invention that is typical of poly(p-phenylene terephthalamide) fibers prepared by conventional wet spinning yields e.d. patterns similar to FIG. 4 in both the S- and L-positions.

Quality Tests for Diffraction Patterns — Class I Structures

Suitable e.d. patterns have features as follows:

A. At least one pair of maxima with a center line that is parallel (within ± 30°) to the index line and one of the following arrangements.
  1. a second pair of maxima with a center line that is parallel (within ± 30°) to the index line (cf. FIG. 4), or
  2. a second pair of maxima with a center line that is perpendicular (within ± 30°) to the index line (cf. FIGS. 3 and 5), or
  3. a diffraction ring (i.e., a major 360° arc without maxima)

4. In some instances the above type patterns may have a second pair of maxima having equal radii to one of the above maxima (cf. FIGS. 5 and 6).

B. Two major diffraction rings.

If features A or B are not realized, a new diffraction pattern set should be made on another section, or another diffraction pattern made on the same section with a slightly displaced selected area aperture position.

If the center lines of two pair of maxima are mutually perpendicular (within 30°) in the S-position pattern then the same reflections in the L-position have their points of maximum density either (1) on center lines that are parallel to one another (within 30°), cf. FIGS. 3 and 4, or (2) on the original mutually perpendicular (within 30°) center lines with the inner and outer reflections interchanges. The absence of condition (1) or (2) is evidence of cutting distortion and new sections should be cut and examined.

The maxima and/or major rings in a set of patterns for a given sample are designated as $a$ or $b$ by inspection of the S-position pattern.

If the S-position pattern has maxima on a line perpendicular (to within ±30°) to the index line (cf. FIGS. 3, 5 and 6), then all rings and/or maxima in both the S- and L-position patterns which correspond in radius [from the center of the pattern] to these maxima are to be labelled $b$ and the other major maxima or rings, if they are presents, are labelled $a$.

If there are no maxima on a line perpendicular (to within 30°) to the index line, and if (1) two pairs of maxima exist that can be connected by lines parallel (to within 30°) to the index line, cf. arrangement of FIG. 4, or (2) if both reflections are complete rings, or (3) if a pair of maxima and a ring are present then the outer (greater distance from the center of the pattern) pair of maxima or outer ring is to be labelled $b$ and the inner one $a$.

Quality Tests for Diffraction Patterns — Class II Structures

Suitable e.d. patterns have features as follows:

A. a single ring in both the S- and L-position patterns or

B. a pair of maxima with a center line that is within 25° of being ($a$) parallel or ($b$) perpendicular to the index line in the S-position pattern and an L-position pattern having a pair of maxima with a center line that is within 25° of being perpendicular or parallel to the index line for conditions ($a$) and ($b$) for the S-position, respectively.

Densitometry

The processed film bearing the e.d. pattern is examined with a Joyce-Loebl Microdensitometer using a 10X objective, 20:1 ratio arm, 1.6 d wedge range and a 4 mm. square slit. Each pattern of a class I structure is scanned along a center line connecting the maxima most nearly parallel to the index line or in the absence of maxima in that area (e.g., for a ring) along the index line. Class II structures having a uniform ring as the major reflection are scanned twice through the center of the pattern, (1) parallel and (2) perpendicular to the index line. A pattern of a class II structure having a pair of maxima are scanned along the center line of the maxima and on a line through the center of the pattern perpendicular to the center line.

FIG. 7 depicts densitometer trace 24 made along the center line of maxima 10 of the pattern of FIG. 4. The peaks 26 and 28, (designated $a$ and $b$) are due to maxima 10 and 12 in FIG. 4. Maximum density plateau 30 is due to the darkened center and a base line is shown.

Analysis of Densitometer Traces

The test requires that the ratio between the heights (proportional to densities in the e.d. pattern) of the peaks be known and the peaks designated $a$ or $b$ by reference to the e.d. pattern. Because the peaks may be close and interfere with each other, correction for this interference (if present) must be made. The method of doing this and the definition of peak height, are discussed below. In all cases a curved back ground line 32 — cf. FIG. 8 — is drawn with a flexible curve rule between the bottom 34 of the center trace 35 and the lower outer portion of the trace 36.

1. Traces Having Two Resolved Peaks

Figure 8:
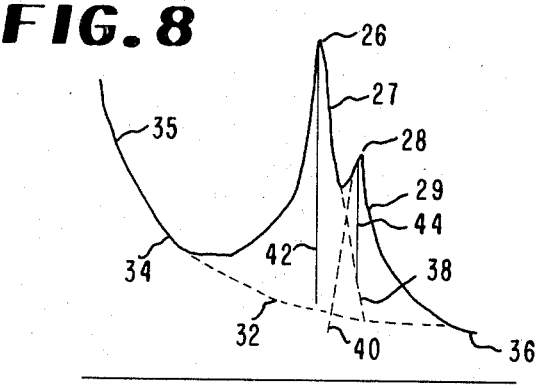
FIGS. 8 and 9 are drawings of a portion of a densitometer trace.

The outer shoulder 27 of the inner peak 26 is extended by a straight line 38 drawn parallel to the essentially linear upper portion of the outer shoulder 29 of the outer peak 28. The inner shoulder of the outer peak 28 is extended by a line 40 drawn parallel to the essentially linear upper portion of the inner shoulder of the inner peak 26. The peak height of a peak is the smaller vertical distance between the peak and 1 the background line or 2 the extension of the shoulder of the other peak. In FIG. 8 the peak height of peak 26 is measured on the vertical 42 from the peak to the background line. The peak height of peak 28 is measured on the vertical 44 between the peak and the extension 38 of the shoulder.

2. Traces Having Two Peaks, One Resolved and One an Inflection

Figure 9:
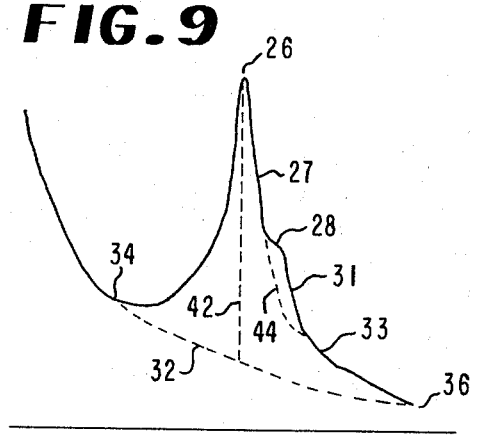

These are resolved in an analogous manner to the above — cf. FIG. 9. A piece of tracing paper is placed over the trace and a horizontal fiducial line drawn. The portion of the trace which includes the inflection 28 of the unresolved peak and the shoulder 31 of the inflection is drawn on the paper. The paper is then shifted, keeping the fiducial line horizontal, so that the drawing of the shoulder blends into the shoulder 27 of the resolved peak and the lower shoulder 33 of the inflection. The drawing is transferred — by carbon paper — to the original trace to give a corrected shoulder 44. The peak height of the inflection 28 is the maximum vertical separation between the original and the corrected shoulder of that peak. The peak height of the resolved peak 26 is the vertical distance from it to the background line.

3. Traces Having a Single Peak

The peak height is the vertical distance from the peak to the background line.

4. Traces With a Broad Maximum Due to Overlapping Peaks

Figure 10:
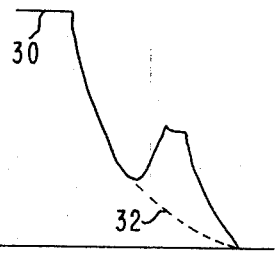

The peak heights are considered to be equal and the ratio of the two peak heights is taken as one, cf. FIG. 10 which depicts a half scan of the pattern of FIG. 6.

Calculations

The sum of the maximum densities of the major diffractions measured in a half scan (center outward) should be at least 0.5 above the density of the background line. If this is not obtained, new e.d. patterns should be prepared.

The scan of the entire pattern should give a substantially symmetrical trace, with the heights (measured above the background line) of the left-hand and right-hand peaks associated with the most intense maximum in the pattern each being no more than 20 percent from the mean of the left- and right-hand values. If this is not obtained, a new e.d. pattern should be prepared with attention to the focus.

Based on the structural factors which determine peak heights, a parameter, A, has been selected as a measure of the degree of preferred structure in the products of the invention. For class I structures $A = (a/b)_S/(a/b)_L$ where $a/b$ is the ratio of the peak heights of diffractions a and b and the subscripts S and L refer to the S- and L-positions respectively.

In the case of class II structures, $A = (H_1/H_2)_S/(H_1/H_2)_L$ where $H_1$ and $H_2$ are defined as follows:

In a (single) ring e.d. pattern, $H_1$ and $H_2$ are the peak heights in a scan perpendicular to the index line, and parallel, respectively. For an e.d. pattern having a single pair of maxima, $H_1$ and $H_2$ are the peak heights in a scan (a) perpendicular (with 25°) to the index line and (within b) perpendicular to scan (a) direction, respectively. The subscripts S and L refer to a pattern taken in the S- and L-positions respectively.

A value of "A" (Ar) is calculated using the values of a and b on the right-hand half of the densitometer trace for both positions. A second value of "A" (Al) is calculated using the values of a and b on the left-hand half of the densitometer trace for the same patterns.

The Lateral Crystallite Order (L.C.O.) value for a fiber (i.e., for a given section) is the average of Ar and Al for that section. If both values are finite, they are averaged directly. If the values consist of a finite value and an infinite value, the reciprocals of the values are averaged and the reciprocal of that average reported. If both values are infinite, the average is infinity.

Following are the L.C.O. values for 3 filaments examined for each example using $i$ as infinity.

| Example | | L.C.O. Values | | |
|---|---|---|---|---|
| I | | i | i | i |
| IIA | (a) | 24 | i | i |
| | (b) | i | i | i |
| | (c) | i | i | i |
| IIB | a | 5.5 | 15 | 34 |
| III | a | i | i | i |
| | $a_1$ | i | i | i |
| | b | 29 | 34 | 38 |
| | $b_1$ | 72 | 80 | i |
| | e | 1.6 | 1.3 | 1.2 |
| | $e_1$ | 3 | 6 | 25 |
| | f | 62 | 63 | 79 |
| | $f_1$ | i | i | i |
| | g | 96 | 107 | i |
| | h | 20 | 27 | 306 |
| | $h_1$ | 27 | 34 | 44 |
| | i | i | i | i |
| | j | 0.9 | 1.0 | 2.8 |
| | k | i | i | i |
| | $k_1$ | 6.6 | 7.1 | 8.0 |
| | l | 20 | 37 | i |
| | r | 1.8 | 1.7 | 1.9 |
| | s | 0.6 | 0.9 | 2.2 |
| IV | a | 15 | 32 | i |
| | b | 3.6 | 1.0 | 6.9 |
| | c | 5.5 | 5.8 | 8.3 |
| V | d | 15 | 68 | 132 |
| | e | 154 | i | i |
| | f | 35 | i | i |
| | g | 15 | 15 | 81 |
| | h | 12 | 75 | 110 |
| | i | i | i | i |

The fibers of Examples III $e, j, k_1, r, s$, IV $b$ and $c$ are less preferred since they do not have L.C.O. values of at least 10 as do fibers of the other examples listed above.

L.C.O. values for PPD-T filaments prepared by conventional wet spinning methods range from 0 to 5.0 with most of the values being about 1.0.

Fiber Densities

Fiber densities are measured using the density-gradient tube procedure for plastics specified in ASTM method D 1505-68, Part 27, 1970, modified by using heptane-carbon tetrachloride at 25°C. as the liquid system for the density-gradient tube. The densities of four loosely knotted short (about 1 to 2 cm) lengths of filament or yarn are determined and the average value reported.

Following are the values (to three significant figures) of density (in grams/cubic centimeter, g/cm³) for the fibers of the examples.

| Example | Table | item | density |
|---|---|---|---|
| I | | as-spun | 1.44 |
| II A | IV | a | 1.45 |
| II A | IV | b | 1.45 |
| II A | IV | c | 1.45 |
| II B | | | 1.42 |
| III | II | a | 1.48 |
| | | $a_1$ | 1.43 |
| | | b | 1.42 |
| | | e | 1.40 |
| | | $e_1$ | 1.42 |
| | | f | 1.41 |
| | | $f_1$ | 1.42 |
| | | g | 1.43 |
| | | h | 1.43 |
| | | $h_1$ | 1.46 |
| | | i | 1.43 |
| | | j | 1.47 |
| | | k | 1.39 |
| | | $k_1$ | 1.36 |
| | | l | 1.43 |
| | | r | 1.46 |
| | | s | 1.40 |
| IV | III | a | 1.45 |
| | | b | 1.46 |
| | | c | 1.44 |
| V | IV | d | 1.45 |
| | | e | 1.45 |
| | | f | 1.44 |
| | | g | 1.41 |
| | | h | 1.45 |
| | | i | 1.43 |

The wholly aromatic polyamide fibers of this invention will preferably have a density of at least 1.38 g./cm² to assure that the fibers will not have an excessive amount of voids or bubbles that would significantly reduce the expected tensile strength.

The fibers of this invention are particularly useful in high tenacity ropes, oceanographic and helicopter lift cables, industrial sewing thread, body armour fabrics and felts and as reinforcement for resins, rubbers and plastics in those applications where the high strength and toughness of the fiber are important.

EXAMPLE I

PPD-T of 5.4 I.V. is mixed in a beaker with sulfuric acid (99.7% $H_2SO_4$) in the ratio of 46 grams of polymer per 100 ml. of acid (20% by weight). The crude mixture of dough-like consistency is transferred to a mixing device consisting of two open top cylinders (each of about 250 ml. capacity) connected by stainless steel tubing which is also connected through a tee to a gooseneck that is temporarily plugged. Each cylinder has a filter pack [3–50 mesh screens/1–325 mesh screen/3–50 mesh screens, mesh/inch (mesh/2.54 m.)] at its base. The mixing device is fitted to a pair of pistons which closely fit each cylinder. A small hole in each piston is opened for the initial fitting by each piston to insure the removal of air and then closed. A water bath at about 95°C. is placed around the mixing device. After about 1 to 2 hours the polymer-solvent mixture is pushed by the pistons from one cylinder to the other for a total of about 5 cycles. With all of the mixture, now a dope, in one cylinder (and the connecting passage), the plug is removed from the gooseneck attached to the connecting passage and the gooseneck is connected to an electrically heated spinning block having a stainless steel felt filter (Dynaloy X5 made by Fluid Dynamics, Inc., of Morristown, N.J.) and a 0.5 inch diameter spinneret with 50 holes of 2 mil (0.05/mm)/diameter. The 95°C. water bath is replaced around the mixing device and the initial length of the tubing. The short length of the tubing between the water bath and the spinning block (100°C.) is wrapped with a steam line.

The dope is pumped from the mixing device through the spinneret at 210 f.p.m. (64 m.p.m.) jet velocity through a 1 cm layer of air vertically into water at 4°C. using a spinning tube and windup similar to that shown in FIG. 1 at a speed to give a SSF of 6.9.

The fibers after a thorough washing and air drying have an I.V. of 4.8 and a d.p.f. of 0.92.

A portion of the dried yarn is plied to a total denier of 183 and passed through a 10 feet long (3.05 meters) tube containing nitrogen at 525°C. under a tension of 1.4 gpd at a speed to give a residence time of about 2 seconds (300 fpm). The yarn is only drawn about 1.005 times its original length.

Properties of the plied as-spun and heat treated fibers are given below.

|  | as-spun | heat-treated |
|---|---|---|
| filament, Ten./E/Mi/tou. | 26/3.7/750/0.50 | 21/2.2/950/0.23 |
| yarn, Ten./E/Mi | 22.8/2.8/811 | 20.5/1.7/1103 |
| yarn, tou., gpd | 0.314 | 0.164 |
| orientation angle | 11.2° | 9.0° |
| apparent gpd | 40 A | 109 A |
| size |  |  |

EXAMPLE II

A

PPD-T polymer of 6.0 I.V. is added to sulfuric acid (99.7% $H_2SO_4$) at 40°C. in a water-jacketed commercial planetary mixer through a top entrance over about 2 minutes to give a ratio of 46 grams of polymer/100 ml. of acid. The mixer is sealed and placed under 68.5 to 76 cm. of Hg vacuum. The temperature of the water jacket is increased to 85°C. and the planetary mixing blades started at a slow speed. After about 12 minutes the jacket temperature is reduced to 77°C. which affords a temperature in the solution of between 79°–82°C. Mixing is continued for about 2 hours. The solution then has a bulk viscosity of 2,300 poises.

The dope is transferred to a glass-lined, water-jacketed (90°C.) kettle. A vacuum of about 69–76 cm. of Hg is applied for about 30 minutes to remove any air or bubbles caused by the transfer. The dope is pumped from the kettle through a transfer line closely wrapped with a water line (90°C.) to an electrically heated (80°C.) spinning block and attached gear pump. The gear pump meters the dope through another passage in the block to a water-jacketed (80°C.) spinneret pack containing a backing screen, stainless steel felt and a 0.5 inch (12.7 mm.) diameter spinneret containing 100 holes of 2 mil (0.051 mm.) diameter. The dope is extruded from the spinneret at a jet velocity of about 207 f.p.m. (63 m.p.m.) vertically through a 5 mm. layer of air into 1°C. water in a spinning tube similar to that shown in FIG. 1. Items a and b are made using a freely revolving roller under the spin tube to direct the threadline to the windup while item c uses a ceramic rod. The yarn is wound up at different speeds on a bobbin under a water (50°C.) spray. The bobbins of yarn are stored in a tank of water. The bobbins are then submersed in 0.1N $NaHCO_3$ and then further extracted with water (70°C.) on an advancing reel extracting device of the type shown in U.S. Pat. No. 2,659,225. The extracted yarn is wound up and dried on the bobbins at 70°C. Properties of the dried yarn of 5.2 I.V. are given as items a, b and c in Table IV. These items have spin stretch factors of 1.5, 3.4 and 4.4 respectively.

B

A dope containing 46 grams of PPD-T (I.V. 5.9) per 100 ml of sulfuric acid (above 99% $H_2SO_4$) is mixed and extruded from a slot 2.5 mil × 0.35 inch (0.63 × 8.9 mm) at a jet velocity of about 64 feet (19.5 m) per minute through a 3.2 mm layer of air into a 1.6 × 25 mm vertical flume of 7°C. water and the film passed under a ceramic rod and wound up on a bobbin at a SSF of about 2.3. The bobbin is sprayed with saturated aqueous $NaHCO_3$ solution. After neutralizing, washing, and drying, the film of 871 denier has a Ten./E/Mi 18/5.7/360 when broken using a 2 inch (5cm) gauge length at 100 percent elongation per minute. Conditioning and testing is done in the environment used for yarns. The film has an I.V. of at least 5.0.

C

The general procedure of B is followed to make films but using (a) a lower I.V. (5.4) PPD-T, (b) a thicker extrusion slot of 4 × 437 mils, (c) a 12.5 mm. layer of air, (d) a jet velocity of about 68 feet per minute, (e) a larger SSF of 7.4 and (f) drying at 95°–120°C. under 4 gpd tension (versus 0.1 to 0.2 gpd at 120°C. for B). Conditions (a), (b) and (e) are considered most relevant. The product of 450 denier is about 0.7 mil thick by 106 mils wide, has an I.V. of 4.8, and has the following properties (average of three breaks), film tenacity 12.3 gpd, elongation 3.0 percent and modulus 570. Three sections of the film have LCO values of 12, 4.4 and 14.

It has been observed that the films made by this process to date have not developed the strength of round filaments. This is considered to be caused primarily by small variations in spinning conditions (length of air layer, turbulence of the coagulating bath and tensions on the film) which result in property differences across the width of the film and the edge effect which reduces the strength to that of the weakest section.

Useful films can be made with a thickness of about 0.1 to 3 mils (preferably about 0.5 to 1.5 mils) and a width of from about 20 mils to 2 inches and larger. Such films may have a film tenacity of at least 12 gpd and preferably at least 15 gpd. Films of 20 mils or more in width have a significant advantage over fibers having a diameter equal to the film thickness since higher volumes of films can be obtained in reinforced structures and films yield thinner prepregs than can be obtained from fiber yarns and therefore afford greater isotropy of distribution in a multiply composite.

EXAMPLE III

This example shows the use of various polyamides made from diamines and diacid halides.

The polymers are made by dissolving the amine in the solvent, cooling the amine solution to about 5° to 10°C., then rapidly adding the diacid chloride with stirring and continuing the stirring, when possible, for at least about 1 hour. The polymer is recovered from the crumbs or gel by pulverizing it in water in a Waring Blendor type mixer, collecting on a filter and repeated washings with water and then drying. The usual precautions in forming high molecular weight polymers are observed.

Monomers used and the polymers formed are shown in Table I where the abbreviations "PPD" and "TCl" are used for p-phenylenediamine and terephthaloyl chloride respectively. Some specific details of the polymerization are given in Table II. When two monomers of the same type are used for copolymers the molar ratio of the monomers is given.

Mixtures of two solvents, hexamethylphosphoramide (A) and N-methylpyrrolidone (B) are used for all items except item a where 100% N,N-dimethylacetamide (DMAc) was used and item j, where equal volumes of B and DMAc were employed. The weight ratio of the 2 solvents is given in the table as is the weight ratio of the solvent to the total monomers.

Dopes are prepared using sulfuric acid (99.7 to 100.0% $H_2SO_4$) (a mixture of sulfuric and fluorosulfuric acids in a weight ratio of 1:1 for items j, l and n and 1.15:1 for item $b_1$) to give 46 grams of polymer/100 ml. of acid (20 weight %). In some cases the polymer used is a blend of several polymerizations.

The dopes are extruded at temperatures (spinneret block) between 51° and 100°C. (except item j, 35°C.) using the apparatus and technique of Example I from spinnerets containing 2 or 3 mil (0.051 or 0.076 mm.) diameter holes through a layer of air (0.5 to 1.9 cm.) into water (0° to 4°C.) and the filaments wound up at speeds ranging from 230 f.p.m. (71 m.p.m.) for item j to 1,430 f.p.m. (483 m.p.m.) for item p. The fibers are thoroughly washed in water and dried on the bobbins.

S.S.F. and filament properties are given in Table II. The I.V. on item e and $e_1$ is measured at a concentration of 0.1 percent.

A 20/80 copolymer of item q, a 5/95 copolymer of items c, d, m and o and the homopolymer of n and p, all of Table I, can be spun by the above procedure into fibers.

TABLE I

| Item | Diamine — Diacid Chloride | Polymer | Polymer Code |
|---|---|---|---|
| a. | chloro-p-phenylenediamine — TCl | poly(chloro-p-phenylene terephthalamide) | ClPPD-T |
| $a_1$. | chloro-p-phenylenediamine/PPD — TCl | copoly(chloro-p-phenylene/p-phenylene terephthalamide | ClPPD/PPD-T |
| b. | 1,2-bis(p-aminophenyl)ethane/PPD — TCl | copoly(4,4'-bibenzylene/p-phenylene terephthalamide) | DDE/PPD-T |
| c. | 3,3'-dimethylbenzidine/PPD — TCl | copoly(3,3'-dimethyl-4,4'-biphenylene/p-phenylene terephthalamide) | DiMePP/PPD-T |
| d. | m-phenylenediamine/PPD — TCl | copoly(m-phenylene/p-phenylene terephthalamide) | MPD/PPD-T |
| e. | PPD — 4,4'-bibenzoyl chloride/TCl | copoly(p-phenylene 4,4'-biphenylene-dicarboxamide/terephthalamide) | PPD-BB/T |
| f. | PPD — fumaryl chloride/TCl | copoly(p-phenylene fumaramide/terephthalamide) | PPD-Δ4/T |
| g. | PPD — 4,4'-azobenzenedicarbonyl chloride/TCl | copoly(p-phenylene 4,4'-azobenzene-dicarboxamide/terephthalamide) | PPD-$BN_2$B/T |
| h. | PPD — chloroterephthaloyl chloride/TCl | copoly(p-phenylene chloroterephthalamide/terephthalamide) | PPD-Cl T/T |
| i. | PPD — isophthaloyl chloride/TCl | copoly(p-phenylene isophthalamide/terephthalamide) | PPD-I/T |
| j. | PPD — chloroterephthaloyl chloride | poly(p-phenylene chloroterephthalamide) | PPD-ClT |
| k. | PPD-trans-hexahydroterephthaloyl chloride/TCl | copoly(p-phenylene trans-hexahydro-terephthalamide/terephthalamide) | PPD-HT/T |
| l. | 4,4'-diamino diphenyl ether/PPD — TCl | copoly(4,4'-oxydiphenylene/p-phenylene terephthalamide) | POP/PPD-T |
| m. | PPD — sebacyl chloride/TCl | copoly(p-phenylene sebacamide/terephthalamide) | PPD-10/T |
| n. | PPD-2,6-naphthalene dicarboxylic acid chloride | poly(p-phenylene 2,6-naphthalene dicarboxamide) | PPD-2,6N |
| o. | 4,4'-diaminodiphenylmethane/PPD — TCl | copoly(4,4'-methylene diphenylene/p-phenylene terephthalamide) | DDM/PPD-T |
| p. | 2-methyl-p-phenylenediamine dihydrochloride — TCl | poly(2-methyl-p-phenylene terephthalamide) | McPPD-T |
| q. | PPD — oxalyl chloride/TCl | copoly(p-phenylene oxamide/terephthalamide) | PPD-2/T |
| r. | PPD — 2,5-pyridinedicarboxylic acid chloride | poly(p-phenylene 2,5-pyridinedicarboxamide) | PPD-2,5-Pyr |

TABLE II

| Item | Polymer | Solvents A/B | Solvent Monomers | S.S.F. | I.V. Yarn | Filament Properties | | | | | PACS A | O.A. |
|---|---|---|---|---|---|---|---|---|---|---|---|---|
| | | | | | | Ten | E | Mi | dpf | tou. | | |
| a | Cl PPD-T | | | 11.3 | 3.3 | 3.9 | 18 | 6.5 | 370 | 3.9 | 0.61 | 17 | 27.0 |
| $a_1$ | Cl PPD/PPD-T | 25/75 | 1.0 | 8.3 | 3.0 | 5.7 | 22 | 6.9 | 350 | 4.3 | 0.74 | 0 | 23.8 |
| b | DDE/PPD-T | 7.5/92.5 | 1.0 | 5.6 | 3.1 | 3.4 | 21 | 3.8 | 730 | 2.1 | 0.43 | 38 | |
| e | PPD-BB/T | 55/45 | 1.0 | 9.7 | 2.1 | 5.3 | 21 | 5.5 | 690 | 3.4 | 0.64 | <20 | 19.6 |
| f | PPD-Δ4/T | 40/60 | 1.0 | 15.3 | 4.4 | 3.3 | 18 | 5.7 | 560 | 1.6 | 0.55 | <20 | 20.2 |

TABLE II—Continued

| Item | Polymer | Solvents A/B | Solvent/Monomers | S.S.F. | I.V. Yarn | Filament Properties | | | | | PACS A | O.A. |
|---|---|---|---|---|---|---|---|---|---|---|---|---|
| | | | | | | Ten | E | Mi | dpf | tou. | | |
| g | PPD-BN$_2$B/T | 5/95 | 9.0 | 4.9 | 2.1 | 3.4 | 19 | 4.6 | 500 | 3.1 | 0.45 | 40 | |
| h | PPD-Cl T/T | 5/95 | 1.0 | 8.5 | 3.3 | 5.5 | 23 | 4.2 | 580 | 4.2 | 0.46 | 43 | 18.7 |
| i | PPD-I/T | 5/95 | 9.0 | 4.7 | 3.3 | 3.9 | 20 | 4.6 | 580 | 1.5 | 0.49 | 34 | |
| j | PPD-ClT | | | 7.8 | 1.7 | 3.7 | 21 | 4.8 | 640 | 1.9 | 0.54 | <20 | 21.8 |
| h$_1$ | PPD-Cl T/T | 50/50 | 0.96 | 8.0 | 2.8 | 5.0 | 21 | 4.5 | 630 | 1.9 | 0.50 | <20 | |
| k | PPD-HT/T | 25/75 | 1.0 | 9.2 | 6.0 | 4.3 | 22 | 4.5 | 540 | 1.4 | 0.51 | 24 | 14.0 |
| k$_1$ | PPD-HT/T | 50/50 | 1.0 | 9.2 | 5.5 | 3.4 | 18 | 4.9 | 490 | 2.1 | 0.47 | 31 | |
| l | POP/PPD-T | 5/95 | 1.0 | 5.5 | 2.6 | 4.3 | 24 | 6.2 | 520 | 2.6 | 0.78 | 26 | 16.6 |
| r | PPD-2,5Pyr | | 9.0 | 19.8 | 4.9 | 5.3 | 18 | 5.8 | 470 | 3.5 | 0.57 | 22 | 16.4 |
| s | PPD-2,6N/T | 50/50 | 1.4 | 12.7 | 5.3 | | 19 | 5.6 | 580 | 1.3 | 0.56 | 0 | 20.3 |
| e$_1$ | PPD-BB/T | 10/90 | 1.0 | 10.7 | 3.5 | 6.5 | 26 | 6.4 | 620 | 4.1 | 0.88 | 15 | 15.1 |
| f$_1$ | PPD-A4/T | 20/80 | 1.0 | 14.7 | 3.9 | 4.3 | 24 | 5.7 | 680 | 1.6 | 0.76 | 22 | 14.8 |
| b$_1$ | DDE/PPD-T | 10/90 | 0.7 | 5.7 | 4.6 | 3.2 | 22 | 3.6 | 730 | 1.4 | 0.41 | 37 | |

EXAMPLE IV

This example shows polyamides made from A-B monomers.

A random copolymer (item a) (p-benzamide/p-phenylene terephthalamide 25/75) is made by adding p-aminobenzoyl chloride hydrochloride to a cooled (about 6°C.) solution of p-phenylenediamine in a mixture of 10.4 parts by weight of hexamethylphosphoramide and 10 parts by weight of N-methylpyrrolidone. After about 5 minutes and with continued cooling to about 6°C., terephthaloyl chloride is rapidly added with stirring. Stirring is continued for about 5 minutes. The polymer is recovered as above. The mole ratio of the three monomers used is 1:3:3 respectively.

A random copolymer (item b) (p-benzamide/chloro-p-phenylene terephthalamide 75/25) is made by dissolving p-aminobenzoyl chloride hydrochloride and chloro-p-phenylenediamine in N,N-dimethylacetamide, cooling to about 11°C., rapidly adding terephthaloyl chloride with stirring and recovering the polymer as above after standing overnight. The mole ratio of the monomers is 3:1:1 respectively.

A homopolymer (item c) [poly(p-benzamide)] is made by cooling N,N-dimethylacetamide to −10°C. and rapidly adding 4-(p-aminobenzamido)-benzoyl chloride hydrochloride (solvent/monomer weight ratio = 6.5) with stirring. After 2.75 hours of stirring, the mixture is neutralized with lithium carbonate and stirring is continued another 1.5 hours. The polymer is recovered as above.

The polymer I.V. range from 4.0 (item b) to 5.9 (item c). Dopes are prepared using sulfuric acid (99 to 100% H$_2$SO$_4$) to give about 46 grams of polymer/100 ml of acid (20 weight %) for all items except c (40 g/100 ml or 18 weight %).

The dopes are extruded at temperatures between 37° (item b) and 68°C. (item c) using the apparatus and technique of Example I from spinnerets containing 2 or 3 mil (0.051 or 0.076 mm) diameter holes through a layer of air (0.5 to 1.2 cm) into water (1° to 3°C.) and the filaments wound up at speeds ranging from 600 f.p.m. (184 m.p.m.) for item b to 1,060 f.p.m. (325 m.p.m.) for item c. The fibers are thoroughly washed in water and dried on the bobbins.

Properties are given in Table III.

TABLE III

| Item | S.S.F. | I.V. Yarn | Filament Properties | | | | | PACS A | O.A. |
|---|---|---|---|---|---|---|---|---|---|
| | | | Ten. | E | Mi | dpf | Tou. | | |
| a | 4.7 | 5.4 | 32 | 5.4 | 800 | 1.9 | 0.90 | 32 | 11.9 |
| b | 4.5 | 3.9 | 23 | 4.8 | 680 | 3.3 | — | 14 | |
| c | 5.7 | 3.7 | 19 | 4.0 | 570 | 1.0 | 0.41 | 11 | 15.8 |

EXAMPLE V

Fibers of PPD-T are prepared using the general spinning conditions of Example II-A with the exceptions noted below. Fiber properties are shown in Table IV for items d to i.

Extrusion temperatures are about 85°C except for item i which is 95°C. The coagulating bath is 1 −4°C water except i which is 20°C water. Items d, e, f, and h use a roller after the spin tube; items g and i use a ceramic pin. Items e and h are extruded from spinnerets with 570 and 285 holes, respectively. All spinnerets contain 2 mil (0.05 mm) diameter holes except item f (20 holes of 6 mil, 0.15 mm diameter). Jet velocities range from 68 (item f) to 200 (item i) feet/minute (ca. 21 to 58 meters/min.). Spin-stretch factors range from 3.5 (item i) to 5.2 (item d). Item g is prepared from granules of solidified dope by remelting in a screw melter.

Items e and h use a feed wheel sprayed with NaHCO$_3$ before the windup which is sprayed with water; e and h store the bobbins in water and then in dilute aqueous NaOH when feeding the extracting device. Items e and h are dried on hot rolls at 120°C.

Items f and i are washed on the bobbin with water and for 12 hours standing in water and then dried in air at room temperature.

Items d are g are washed with aqueous sodium bicarbonate solution on the windup and in the bath before the extracting device. Item d is dried at 40°C and item g is dried at 75°C.

The yarns of items d, g and h are 6 ply, 4 ply and 2 ply respectively.

The filament properties on items d, e and h are made on 5, 5 and 4 breaks respectively.

The yarns of this example are particularly useful for preparing tire cords. Such yarns should have an I.V. of at least 4.0, and have yarn properties (ten/E) of at least 18 gpd and 3 percent. Preferably, yarns for use in tire cords should have an I.V. of 4.5 and ten/E/tou (on yarn) of 20/3.5/0.35. The filaments of preferred yarns will have a dpf of less than 2.5 and preferably <2.0 since a greater conversion of yarn strength to tire cored strength is obtained than with larger dpf. Preferred yarns have a tenacity/elongation/toughness as measured at 150°C that is at least 70 percent of the value measured at 24°C.

TABLE V

| Cord Properties | a | b |
|---|---|---|
| Denier | 1686 | 1615 |
| Tenacity, gpd | 15.6 | 19.0 |
| Elongation, % | 3.7 | 4.7 |
| Modulus, gpd | 390 | 365 |
| Toughness, gpd | 0.28 | 0.43 |
| loop tenacity, gpd | 6.0 | 6.2 |
| loop elongation, % | 1.6 | 1.8 |

TABLE IV

| Item | I.V. Yarn | PACS A | O.A.° | YARN PROPERTIES | | | | Yarn D.P.F. | Yarn Denier | Filament Properties | | | |
|---|---|---|---|---|---|---|---|---|---|---|---|---|---|
| | | | | Ten. | E | Mi | Tou. | | | Ten. | E | Mi | Tou. |
| a | 5.2 | 45 | 20.0 | 21.2 | 3.9 | 547 | 0.39 | 3.7 | 415 | 26 | 5.6 | 570 | 0.73 |
| b | 5.2 | 49 | 13.9 | 22.8 | 3.2 | 727 | 0.35 | 1.9 | 190 | 27 | 4.8 | 680 | 0.67 |
| c | 5.2 | 49 | 11.5 | 24.8 | 2.8 | 948 | 0.34 | 1.4 | 135 | 27 | 4.3 | 680 | 0.62 |
| d | 5.2 | 38 | 22.4 | 21.9 | 4.1 | 459 | 0.41 | 1.3 | 774 | 22 | 4.2 | 510 | 0.46 |
| e | 4.7 | 48 | 16.0 | 23.2 | 3.6 | 575 | 0.39 | 1.2 | 710 | 24 | 4.5 | 520 | 0.53 |
| f | 5.4 | 39 | 14.6 | 21.5 | 3.5 | 629 | 0.35 | 12.5 | 253 | 21 | 4.7 | 600 | 0.50 |
| g | 4.7 | 49 | 15.8 | 21.1 | 3.4 | 556 | 0.34 | 2.0 | 780 | 24 | 4.6 | 630 | 0.57 |
| h | 4.8 | 51 | 17.2 | 25.0 | 4.1 | 529 | 0.52 | 1.2 | 702 | 28 | 4.8 | 580 | 0.67 |
| i | 5.2 | 47 | 15.3 | 18.2 | 3.0 | 586 | 0.26 | 1.8 | 176 | 21 | 4.1 | 510 | 0.43 |

EXAMPLE VI

This example illustrates the utility of the fibers of this invention in tire cords.

Yarns of the same fibers of item g (Table IV) and essentially the same as item d (Table IV) are plied to give total yarn deniers of 800 and 781 respectively for items a and b of Table V. The yarns contain about 0.5 percent of a textile finish.

The plied yarns are given Z twist and two twisted yarns plied with S twist to give greige tire cords.

The greige tire cords are dipped into a subcoat solution A and passed through an oven under a tension of 3.5 pounds (1.5 kg.) at 246°C. for 1 minute. The amount of pick up is estimated to be 0.5 to 1.0 percent by weight. The predipped cords are then dipped into adhesive mixture (B) and passed through an oven under a tension of 1 pound (454 g.) at 246°C. for 1 minute. The cured cord has an adhesive coating with total solids amounting to about 5 percent by weight.

The Z twist in the single yarns of the dipped cord is about 12.2 and 12.0 turns per inch (per 2.54 cm.) for items a and b. The S twist in the dipped cord is about 11.8 turns per inch (per 2.54 cm.) for both items a and b.

Solution A contains by weight 43 parts of water, 0.05 parts of sodium hydroxide, 1 part of a polyepoxide, diglycidyl ether of glycerol [1,3-di(2,3-epoxy propoxy) propane] (EPOM 812 by Miller-Stephenson Chemical Co. of Danbury, Conn.), 1 part of a blocked isocyanate, bis-N,N'-(4,4'-diphenyl methane)phenyl urethane and 5 parts of 2-pyrrolidone as generally taught in U.S. Pat. No. 3,464,878 to Schwarz.

Adhesive mixture B is made by aging at 10°C. an interim dip mixture containing by weight 11 parts water, 5.5 parts resorcinol, 2.98 parts of 37% formaldehyde and 14.3 parts of vinyl pyridine/styrene/butadiene copolymer latex of 41% solids for 96 hours and then adding 3.58 parts of a natural latex of 41% solids. This mixture of 37% solids is diluted to 25% solids before use to give the final adhesive mixture B.

The above cords are used to make belts in belted radial tires. The tires perform satisfactorily.

A cured cord essentially the same as item b above has a P.A.C.S. of 62A and an orientation angle of 18°. This type of heat treatment can increase the P.A.C.S. of the as-spun yarn by about 8 to 30A.

Tire cords made from the fibers of this invention by the usual coating and hot stretch process are useful for all types of tire reinforcements, e.g. in the carcass and-/or belt of bias, bias-belted and radial-belted tires.

A METHOD USING OPTICAL PROPERTIES TO MEASURE LATERAL ORDER IN FIBERS OF THIS INVENTION

Preliminary observations designed to give an idea of the range of refractive index values for $n_{\parallel}$ and $n_{\perp}$ are made on short lengths of fibers placed in a transmission interference microscope (e.g., the two beam instrument made by E. Leitz & Co.). The fibers are mounted in a series of "Cargille" index of refraction liquids to find the point at which the index of the oil matches the index of the fiber (minimum fringe shift) first for $n_{\parallel}$, then for $n_{\perp}$. Fibers of this invention are characterized by a relatively uniform $n_{\parallel}$, and an $n_{\perp}$ that decreases somewhat toward the center of the fiber.

A well aligned bundle about 1 mm. in diameter and 5 cm. long is then taped to flat Teflon TFE-fluorocarbon resin plate. A drop of epoxy embedding material described above in the LCO Test is placed at the center of the bundle and the mounted sample placed in an oven at 60°C. for about 20 hours. In that time, the embedding material flows through the bundle and polymerizes. A short segment is cut from the preparation and glued (e.g., with "DUCO" Cement) to the end of a tapered rod in such a way that when the rod is placed in the chuck of a microtome, oblique sections (about 45° to the fiber axis) about 0.2 μ thick can be prepared. This cutting is best done with a microtome designed for preparing ultra-thin sections (e.g., for "Ultrotome" made by LKB, Stockholm, Sweden) at a cutting speed of 1 mm./sec. or less. The fiber bundle should be oriented in a plane that is normal to the knife edge. Furthermore, the bundle should be inclined at about a 45° angle to the cutting direction.

Sections for study in the optical microscope are picked off the microtome water trough with a small piece of microscope cover glass and transferred to microscope slide by floating the sections on a drop of water. The water is then removed with a piece of filter paper or by evaporation. The slide is cut in half and both pieces transferred to the stages of a Leitz Interference Microscope. The piece containing the sections is placed in the measuring beam of the microscope, and the other piece of slide is placed in the reference beam. The microscope is set for interference contrast. Using green light ($\lambda = 0.564\ \mu$), one records the distant ($D$) the wedge compensator has to be moved between black background settings, and the distance ($d$) between black background and black sections. It is proper to have the analyzer set with its polarization direction parallel to the short axis of the fiber sections. Then using the approximate value of $n_\perp$ found by the method described in the first paragraph above, one can calculate the section thickness ($T$) from $$T \text{ (in microns)} = [(d/D)\ \lambda \text{ (in microns)}]/(n_\perp - n_R)$$

wherein $n_R$ is the refractive index of the reference fluid, which in this case is air ($n_R = 1.00$).

The sections are then mounted in an oil of refractive index near $n_\perp$ ($\sim 1.64$), a cover glass added and the preparation transferred to a universal stage on a polarizing microscope (e.g., a "Dialux-Pol" polarizing microscope with a five axis Fedorow Stage, both made by E. Leitz & Co.). White light is used and in the calculation below we assume a wave length, $\lambda = 0.55\ \mu$. The polarizer and analyzer are crossed in the 45° position, and an elliptical compensator having a maximum range of $\lambda 130$ (made by E. Leitz & Co.) is placed in the conventional compensator slot. Measurements are made by eye using a 32X objective lens and a 6X eyepiece.

In the following part of the discussion, we assume that the fibers have cross-sections that are essentially circular.

The universal stage is set to the zero tilt position and the sections rotated about the vertical axis in such a way that the long axes of the fiber sections are at 45° to the polarizer, and a tilt axis set parallel to the major and minor axes of the sections. With the compensator removed, the sections are then tilted about the axis that is parallel to the minor axis of the sections to a point of minimum average intensity within the sections. The sections are then tilted about the axis parallel to the major axis of the sections to minimum intensity, or to the appearance of a maltese cross. The amount of tilt in each axis in recorded. These angles can be used to calculate the increase in path length introduced by tilting (see "Manual of the Polarizing Microscope", by A. F. Hallimond, Published by Cooke, Troughton, and Simms Ltd., York, England 1953), but we have felt this unnecessary when considering the precision required. However, the second tilt is a useful measure of section distortion. We have found that if the tilt about the major axis of the sections is greater than 20°, the section is judged to be poor and the sectioning procedure should be repeated.

The compensator is then inserted and the angle corresponding to the maximum amount of compensation required to produce extinction along the minor axis of the section is noted. The compensator is then set at the angle corresponding to the maximum amount of the compensation required to produce extinction along the major axis of the section. This angle is noted and subtracted from the first compensator setting. This difference is recorded as $2\phi$, maintaining the sign of the difference. The lateral birefringence ($\Delta n$) is then calculated from:

$$\Delta n = (K\ \lambda\ \text{Sin}\ 2\phi)/T$$

where $K$ is an instrumental constant provided by the manufacturer of the compensator, $\lambda$ is the wave length of light used (in microns), $2\phi$ is the difference in compensator readings defined above, and T is the section thickness in microns. Positive Lateral Birefringence is defined as $n_r > n_t$, where $n_r$ is the index of refraction for light polarized such that the electric vector is along the radius of the fiber cross-section, and $n_t$ is the index of refraction for light polarized such that the electric vector is along the normal to the radius of the fiber cross-section.

Generally, compensator readings of birefringence on five or ten filaments, or on as many filaments as are necessary in order to obtain a representative sampling of the fiber bundle, are made and averaged to obtain the Lateral Birefringence. In viewing each section, there should be no cutting distortions or other artifacts which would be apparent to one skilled in the art, although a slight change in the inclination of the optic axis from its expected position is allowed if it can be compensated by tilting. Those sections having distortions other than those allowed in the previous sentence should be disregarded. It may also be preferred, in some cases, that a new section be prepared which is free of distortion and artifacts. In most cases compensator readings to obtain the birefringence of the individual filament sections are made at constant settings of the tilt axes. However, it is conceivable that in some instances the filaments will not be aligned parallel to one another within the fiber bundle prior to sectioning, causing individual filaments to be cut at different angles. This requires that the procedures for adjustment of the tilt angles be repeated for each individual filament section before compensator readings are made. As before, any section for which the tilt about the major axis of the section is greater than 20° is disregarded.

The precision of the above method of determining lateral birefringence, $\Delta n$, was calculated to be $\pm 0.003$ at the 90 percent confidence level, irrespective of the value of $\Delta n$.

The above procedure is also applied to fibers which, as part of the test, are heat treated to develop greater crystallinity. Heat treatment may conveniently be carried out by passing the fiber through a nitrogen-filled heated metal tube under at least sufficient tension to prevent contact with the tube walls. The proper temperature inside the tube will be in the range of 425°–500°C. The exposure time of the fiber to the temperature is controlled by the rate of throughput and should be of the order of about 10 seconds.

Following are values of lateral birefringence ($\Delta n$) for some of the fibers of the examples.

| Example | Table | Item | $\Delta n$ | |
|---------|-------|------|------------|---|
|         |       |      | as-spun    | heat treated |
| I       |       |      | 0.050      | 0.072 |
| II      | IV    | a    | 0.045      | 0.032 |
|         | IV    | b    | 0.035      | 0.046 |
|         | IV    | c    | 0.044      | 0.046 |
| III     | II    | h    | 0.031      |       |
| IV      | III   | a    | 0.035      |       |
| V       | IV    | d    | 0.023      | 0.031 |
|         | IV    | e    | 0.028      | 0.036 |
|         | IV    | f    | 0.022      | 0.043 |
|         | IV    | g    | 0.047      | 0.047 |
|         | IV    | h    | 0.027      | 0.037 |
|         | IV    | i    | 0.041      | 0.073 |

All fibers of this invention containing at least about 97 mole percent of PPD-T that have a filament tenacity of at least 18 gpd, are essentially round in cross-section and have a d.p.f. less than about 10 will have a Δn of at least 0.02 on the as-spun condition and preferred fibers will have a Δn of at least 0.025 after heat treatment.

What is claimed is:

1. Fiber or film of polyamide having an inherent viscosity of at least 2.5 as measured at a concentration of 0.5 gram of polymer in 100 ml. of concentrated sulfuric acid (95–98% $H_2SO_4$) at 30°C. and consisting essentially of recurring units selected from the group consisting of:

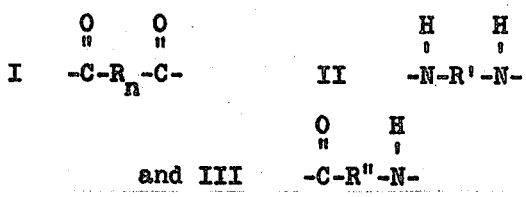

wherein units I and II, if present in the polymer are present in substantially equimolar amounts, R, R' and R'' groups, which may be the same or different, are divalent radicals, $n$ may be zero or the integer one and at least about 95 mol % of the total R, R' and R'' radicals in the polymer are single rigid radicals with chain extended bonds or a series of such radicals which are linked together directly by chain extended bonds, said rigid radicals being selected from the group consisting of single ring and fused multiring aromatic carbocyclic radicals, 2,5-pyridylene, 4,8-quinolylene, trans-1,4-cyclohexylene, and 1,4-[2,2,2]-bicyclooctylene radicals, which rigid radicals may be linked by azo or azoxy groups, and trans-vinylene and ethynylene radicals, with the proviso that vinylene or ethynylene cannot serve as R' or that portion of a R'' radical attached to

at least 75 mol % of the said rigid radicals being aromatic carbocyclic radicals, the chain extending bonds of such radicals being essentially coaxial or parallel and oppositely directed, said fiber or film having a filament or film tenacity of at least about 18 grams per denier, a filament or film elongation of at least 4.5 percent, and crystalline regions with a primary apparent crystallite size (PACS) of less than 52A as determined from an X-ray deffractogram scan along a lone perpendicular to the fiber or film axis using the equation:

$$PACS = \lambda/(\beta \cos \theta)$$

where λ represents the wavelength in A of the X-rays used; θ is the Bragg angle and β is the line breadth in radians, corrected for instrumental broadening, at half intensity of the major reflection located at the smallest value of 2θ.

2. Fiber or film of homopolyamide having an inherent viscosity of at least 2.5 as measured at a concentration of 0.5 gram of polymer in 100 ml. of concentrated sulfuric acid (95–98% $H_2SO_4$) at 30°C. and consisting essentially of recurring units selected from the group consisting of:

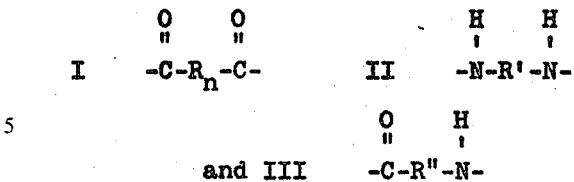

wherein units I and II, if present in the polymer, are present in substantially equimolar amounts, R, R' and R'' groups which may be the same or different, are divalent radicals, $n$ is the integer one and at least about 95 mol % of the total R, R' and R'' radicals in the polymer are single rigid radicals with chain extended bonds or a series of such radicals which are linked together directly by chain extended bonds, said radicals being selected from the group consisting of single ring and fused multiring aromatic carbocyclic radicals, the chain extending bonds of such radicals being essentially coaxial or parallel and oppositely directed, said fiber or film having a filament or film tenacity of at least about 18 grams per denier, a filament or film elongation of at least 3.5 percent, and crystalline regions with a primary apparent crystallite size (PACS) of less than 52A as determined from an X-ray diffractogram scan along a line perpendicular to the fiber or film axis using the equation:

$$PACS = \lambda/(\beta \cos \theta)$$

where λ represents the wavelength in A of the X-rays used; θ is the Bragg angle and β is the line breadth in radians, corrected for instrumental broadening, at half intensity of the major reflection located at the smallest value of 2θ.

3. Fiber or film of claim 1 wherein n is the integer one and R and R' are selected from the consisting of 1,4-phenylene, 4,4'-biphenylene 2,6-naphthylene, 1,5-naphthylene and trans-1,4-cyclohexylene; R may also be selected from the group consisting of 2,5-pyridylene and trans-vinylene; and R'' is 1,4-phenylene.

4. A fiber of poly(p-phenylene terephthalamide) having a filament tenacity of at least 18 grams per denier, a filament elongation of at least 3.5 percent, an inherent viscosity of at least 2.5 as measured at a concentration of 0.5 gram of polymer in 100 ml. of concentrated sulfuric acid (95–98% $H_2SO_4$) at 30°C. and crystalline regions with a primary apparent crystallite size (PACS) of less than 52A as determined from an X-ray diffractogram scan along a line perpendicular to the fiber axis using the equation:

$$PACS = \lambda/\beta \cos \theta$$

where λ represents the wavelength in A of the X-rays used; θ is the Bragg angle and β is the line breadth in radians, corrected for instrumental broadening, at half intensity of the major reflection located at the smallest value of 2θ.

5. The fiber of claim 4 further characterized by a structure that exhibits radial orientation having a lateral crystallite order value of at least 10 as determined from selected peak heights of densitometer traces of electron diffraction patterns of regions on the short and long axes of a 0.1 to 0.2 micron thick oblique section of the fiber.

tially of recurring units selected from the group consisting of:

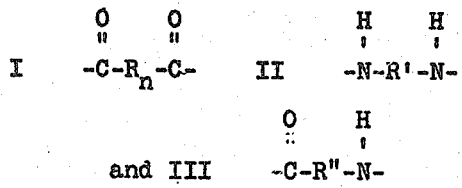

and III  -C-R''-N- wherein units I and II, if present in the polymer are present in substantially equimolar amounts, R, R' and R'' groups, which may be the same or different, are divalent radicals, $n$ is the integer one and at least about 95 mol % of the total R, R' and R'' radicals in the polymer are selected from the group consisting of the following radicals which may bear substituents which are thermally nonreactive during subsequent processing of the polymer 1,4-phenylene, 4,4'-biphenylene, 1,5-naphthylene, 2,6-naphthylene, trans-1,4-cyclohexylene, 2,5-pyridylene, trans,trans-4,4'-bicyclohexylene, and 1,4-phenylene groups linked by trans-vinylene, ethynylene, azo or azoxy; R may also be selected from the group of trans-vinylene, ethynylene, trans,trans-1,4-butadienylene or 2,4'-trans-vinylenephenylene and R'' may be 2,4'-trans-vinylenephenylene, with the proviso that at least 75 mol % of the total of R, R' and R'' are wholly aromatic carbocyclic radicals, said fiber or film having a filament or film tenacity of at least about 18 grams per denier, a filament or film elongation of at least 4.5%, and crystalline regions with a primary apparent crystallite size (PACS) of less than 52A as determined from an X-ray diffractogram scan along a line perpendicular to the fiber or film axis using the equation:

$$PACS = \lambda/(\beta \cos \theta)$$

where $\lambda$ represents the wavelength in A of the X-rays used; $\theta$ is the Bragg angle and $\beta$ is the line breadth in radians, corrected for instrumental broadening, at half intensity of the major reflection located at the smallest value of $2\theta$.

12. Fiber of polyamide having an inherent viscosity of at least 2.5 as measured at a concentration of 0.5 gram of polymer in 100 ml. of concentrated sulfuric acid (95–98% $H_2SO_4$) at 30°C. and consisting essentially of recurring units selected from the group consisting of:

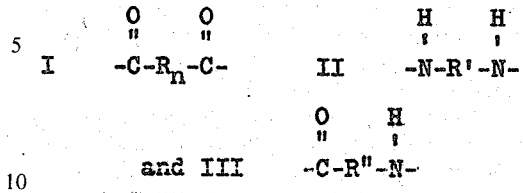

and III  -C-R''-N- wherein units I and II, if present in the polymer are present in substantially equimolar amounts, R, R' and R'' groups, which may be the same or different, are divalent radicals, $n$ is the integer one and at least about 95 mol % of the total R, R' and R'' radicals in the polymer are selected from the group consisting of the following radicals which may bear substituents which are thermally nonreactive during subsequent processing of the polymer 1,4-phenylene, 4,4'-biphenylene, 1,5-naphthylene, 2,6-naphthylene, trans-1,4-cyclohexylene, 2,5-pyridylene, trans,trans-4,4'-bicyclohexylene, and 1,4-phenylene groups linked by trans-vinylene, ethynylene, azo or azoxy; R may also be selected from the group of trans-vinylene, ethynylene, trans,trans-1,4-butadienylene or 2,4'-trans-vinylenephenylene and R'' may be 2,4'-trans-vinylenephenylene, with the proviso that at least 75 mol % of the total of R, R' and R'' are wholly aromatic carbocyclic radicals, said fiber having a filament tenacity of at least about 18 grams per denier, and crystalline regions with a primary apparent crystallite size (PACS) of less than 52A as determined from an X-ray diffractogram scan along a line perpendicular to the fiber or film axis using the equation:

$$PACS = \lambda/(\beta \cos \theta)$$

where $\lambda$ represents the wavelength in A of the X-rays used; $\theta$ is the Bragg angle and $\beta$ is the line breadth in radians, corrected for instrumental broadening, at half intensity of the major reflection located at the smallest value of $2\theta$, further characterized by a structure that exhibits radial orientation having a lateral crystallite order value of at least 10 as determined from selected peak heights of densitometer traces of electron diffraction patterns of regions on the short and long axes of a 0.1 to 0.2 micron thick oblique section of the fiber.

* * * * *

UNITED STATES PATENT OFFICE
CERTIFICATE OF CORRECTION

PATENT NO. : 3,869,429
DATED : March 4, 1975
INVENTOR(S) : Herbert Blades

It is certified that error appears in the above-identified patent and that said Letters Patent are hereby corrected as shown below:

Col. 1, line 41, "processing" should be --possessing--.

Col. 11, line 25, "for" should be --For--.

Col. 12, line 6, "20" should be --29--.

Col. 12, line 51, half-density should be in quotes.

Col. 12, line 58, half-density should be in quotes.

Col. 13, line 21, "employing scintillation" should be --employing a scintillation--.

Col. 14, line 48, "x-ray" should be --X-ray--.

Col. 15, line 18, "fiberor" should be --fiber or --.

Col. 16, line 11, "te section" should be --the section--.

Col. 16, line 48, "of x-ray" should be --by X-ray--.

UNITED STATES PATENT OFFICE
CERTIFICATE OF CORRECTION

PATENT NO. : 3,869,429                        Page - 2
DATED : March 4, 1975
INVENTOR(S) : Herbert Blades It is certified that error appears in the above-identified patent and that said Letters Patent are hereby corrected as shown below:

Col. 17, line 28, "presents" should be --present--.

Col. 19, line 17, "with 25°" should be --within 25°--.

Col. 19, line 18, "and (within b)" should be --and (b)--.

Col. 19, line 22, "(Ar)" should be --($A_r$)--.

Col. 20, line 67, "(mesh/2.54 (m.)_7" should be
         --(mesh/2.54 cm.)_7.

Col. 21, line 44, "apparent gpd size" should be
         --apparent crystallite size--.

Col. 24, Table 1, line 3, "terephthalamide" should be
         --terephthalamide)--.

Col. 24, Table II, heading O.A., under the heading "O.A."
         insert --°--.

Col. 26, Table III, heading O.A., under the heading "O.A."
         insert --°--.

UNITED STATES PATENT OFFICE
CERTIFICATE OF CORRECTION

PATENT NO. : 3,869,429
DATED : March 4, 1975
INVENTOR(S) : Herbert Blades

Page - 3

It is certified that error appears in the above-identified patent and that said Letters Patent are hereby corrected as shown below:

Col. 27, line 48, after "0.05 parts" delete --of--.

Col. 28, line 46, after "bundle" insert --of fibers--.

Col. 29, line 3, after "to" insert --a--.

Col. 29, line 21, in the equation "$[(d/D) \lambda$ (in microns$]$" should read --$[d/D \lambda$ (in microns)$]$--.

Col. 29, line 34, "$\lambda$ 130" should be -- $\lambda/30$--.

Col. 30, line 25, after "compensated" insert --for--.

Col. 30, line 30, after "of" and before "individual" delete --the--.

Col. 31, line 5, "on the as-spun" should be --in the as-spun--.

Col. 31, line 34, "trans-1,4-cyclohexylene" should be --<u>trans</u>-1,4-cyclohexylene--.

Col. 32, line 38, after "the" and before "consisting" insert --group--.

Col. 35, line 19, after "polymer" insert --:-- (colon).

Col. 36, line 19, after "polymer" insert --:-- (colon).

Signed and Sealed this fourteenth Day of October 1975

[SEAL]

Attest:

RUTH C. MASON
Attesting Officer

C. MARSHALL DANN
Commissioner of Patents and Trademarks